(12) United States Patent
Shinde et al.

(10) Patent No.: US 11,039,622 B2
(45) Date of Patent: Jun. 22, 2021

(54) *KAPPAPHYCUS* ACTIVE INGREDIENT COMPOSITIONS FOR MODULATING PLANT CHARACTERISTICS

(71) Applicant: HELIAE DEVELOPMENT, LLC, Gilbert, AZ (US)

(72) Inventors: Sandip Shinde, Gilbert, AZ (US); Manikandadas Mathilakathu Madathil, Mesa, AZ (US)

(73) Assignee: Heliae Development, LLC, Gilbert, AZ (US)

( * ) Notice: Subject to any disclaimer, the term of this patent is extended or adjusted under 35 U.S.C. 154(b) by 100 days.

(21) Appl. No.: 16/340,005

(22) PCT Filed: Oct. 20, 2017

(86) PCT No.: PCT/US2017/057700
§ 371 (c)(1),
(2) Date: Apr. 5, 2019

(87) PCT Pub. No.: WO2018/075948
PCT Pub. Date: Apr. 26, 2018

(65) Prior Publication Data
US 2019/0335760 A1    Nov. 7, 2019

Related U.S. Application Data

(60) Provisional application No. 62/411,058, filed on Oct. 21, 2016.

(51) Int. Cl.
*A01N 25/02* (2006.01)
*A01N 65/03* (2009.01)

(52) U.S. Cl.
CPC ............. *A01N 65/03* (2013.01); *A01N 25/02* (2013.01)

(58) Field of Classification Search
None
See application file for complete search history.

(56) References Cited

U.S. PATENT DOCUMENTS

| 2012/0094831 A1 | 4/2012 | Bartley, Jr. | |
| 2014/0090431 A1* | 4/2014 | Blotsky | C05F 11/08 71/11 |

FOREIGN PATENT DOCUMENTS

| CN | 102674912 | 9/2012 | |
| WO | 2004016656 | 2/2004 | |
| WO | 2014167583 | 10/2014 | |
| WO | WO-2014167583 A1 * | 10/2014 | ............. A01N 65/03 |

OTHER PUBLICATIONS

Shukla, et al, "Carrageenans from Red Seaweeds as Promoters of Growth and Elicitors of Defense Response in Plants", Frontiers in Marine Science, vol. 3, May 31, 2016.
Mercier, et al, "The algal polysaccharide carrageenans can act as an elicitor of plant defence", New Phytolo, vol. 149, No. 1, Jan. 1, 2001, pp. 43-51.

* cited by examiner

*Primary Examiner* — Alton N Pryor
(74) *Attorney, Agent, or Firm* — Heliae Development, LLC; Adam Lunceford

(57) ABSTRACT

Methods of improving characteristics of plants and soil by administering an effective amount of a *Kappaphycus* based composition in low concentration applications are disclosed.

15 Claims, No Drawings

KAPPAPHYCUS ACTIVE INGREDIENT COMPOSITIONS FOR MODULATING PLANT CHARACTERISTICS

CROSS REFERENCE TO RELATED APPLICATIONS

This application claims priority to PCT Application No. PCT/US2017/057700 titled *Kappaphycus* Active Ingredient Compositions for Modulating Plant Characteristics, which was filed on Oct. 20, 2017, in the name of the Applicant and which claims the benefit of U.S. Provisional Application No. 62/411,058, filed Oct. 21, 2016, and titled *Kappaphycus* Based Compositions for Benefiting Plants and Methods of Application, which is hereby incorporated by reference.

BACKGROUND

Whether at a commercial or home garden scale, growers constantly strive to control the growth and health characteristics of plants. Moreover, as the human population increases and the demand for raw plant materials goes up for the food and renewable technologies markets, the importance of efficient agricultural production intensifies. The influence of the environment on a plant's health and production can result in a need for strategies during the growth season which allow the plants to compensate for or to amplify the influence of the environment to achieve a desired outcome with respect to the plants of interest.

Addition of certain nutrients and/or other compounds such as plant biostimulants (including, for example, biostimulants derived from seaweeds), to the soil (often thereby indirectly administering such nutrients to the plants or otherwise improving the soil conditions to modulate plant growth or health), to the seed of a plant, or directly to a plant, typically through application to the foliage, has long been known to promote yield and quality in certain plants. However, despite prior knowledge of such products and their application there continues to be a need for additional ways of modulating the growth and/or health of plants. Moreover, prior art methods of using such compositions, such as compositions derived from the seaweed genus *Kappaphycus*, are often ineffective or limited in their applicability with respect to affecting plant growth and/or health characteristics. The present invention provides methods and compositions that are markedly different from such compositions known in the prior art and provide new and effective ways of modulating plant health and/or growth characteristics.

SUMMARY

Compositions and methods are described for modulating at least one plant characteristic, typically a plant growth and/or health characteristic, which comprise at least one active ingredient portion that is obtained or derived from organisms of the genus *Kappaphycus*. Typically, the *Kappaphycus* active ingredient(s) will be obtained directly from a *Kappaphycus* organism, such as through extraction of an extract from *Kappaphycus* biomass. In other aspects, derivatives of compositions obtained from *Kappaphycus* also or alternatively can be used in the compositions of the invention (for example, a derivative might be produced through conjugation with one or more other chemical moieties). In yet another aspect, bioequivalent compounds, active fragments of such compounds, and the like are synthesized, which correspond or substantially correspond to one or more active ingredients in *Kappaphycus*. An active ingredient in this respect means a composition or compound that is able to produce at least a detectable impact on a plant characteristic. Typically, an active ingredient when applied to a plant, directly or indirectly, or applied to plant-associated soil, will result in at least a desired amount of increase or decrease of one or more target plant health and/or growth characteristics (e.g., by increasing and/or decreasing such characteristics by at least 5%, at least 7.5%, at least 8%, at least 10%, at least 12.5%, at least 15%, at least 20%, or at least 25%, as compared to a control).

Compositions of the invention can include *Kappaphycus* active ingredients as the primary or sole active ingredient, or the *Kappaphycus* active ingredients can be present in combination with one or more other active ingredients such as, but not limited to, extracts or other compositions similarly obtained from other macroalgae, extracts from microalgae and other microalgae-derived or sourced materials, including whole microalgae cells (whole biomass). Compositions of the invention may also or alternatively comprise multiple *Kappaphycus* active ingredients, such as multiple extracts from *Kappaphycus* obtained from different species, subspecies, and/or from the same plant but under different conditions and/or different plant tissues.

Compositions provided by this invention can be in the form of a liquid form or dry form (e.g., they can be provided as a powder, a solid soil implant, or the like). The compositions provided by this invention can be stabilized through the addition of stabilizers suitable for plants, pasteurization, and combinations thereof, or provided with other types of excipients that aid in the operation of the active ingredients, such as excipients that aid in the maintenance of the product on the leaves of plant, the penetration of the product through soil, the uptake of the product, and the like. The methods of the invention can include applying the compositions to plants or seeds in a variety of methods, such as but not limited to, soil application, foliar application, seed treatments (such as seed coating), and/or hydroponic application. The methods can include single or multiple applications of the compositions. In one aspect the compositions and methods of the invention comprise applications of relatively low concentrations of *Kappaphycus* compositions, such as *Kappaphycus* extracts, to modulate at least one plant health and/or growth characteristic. The methods and compositions are expected to have utility in a broad range of plants. In one exemplary aspect, the invention provides compositions and methods for promoting plant growth in legumes, such as in bean-producing plants.

DETAILED DESCRIPTION

Provided by this invention are inventive compositions comprising one or more *Kappaphycus* compositions that are capable of modulating one or more plant health characteristic, plant growth characteristic, or both, as well as methods of using such compositions and methods of making such compositions. Methods and composition of this invention can modulate growth and/or health characteristics in a variety of plants, or lead to other biostimulatory effects in plants and/or in plant-associated soils. A bio-stimulatory effect can be an effect that promotes or retards plant growth, promotes or decreases plant health, promotes or regulates biological activity in soil, or results in a combination of any or all thereof.

In one aspect, a composition of the invention or a method of the invention is applied to modulate a growth characteristic and/or a health characteristic in a plant that is a specialty crop. "Specialty crops" are defined by the USDA and other authorities as fruits, nuts, and vegetables (including floriculture and nursery plants). Typically, the specialty crop is an intensively cultivated crop, meaning that it the plant is subjected to four or more nutrient and/or stimulant treatments during a growing season, which usually are applied every 2-8 weeks during the growing season, such as every 2 week, every 3 weeks, every 4 weeks, every 6 weeks, or every 8 weeks. In one aspect, the specialty crop is a vegetable crop, which may be, for example, a fruit-producing crop (e.g., a strawberry, tomato, or pepper), an edible seed (such as a pea), or a non-fruit producing vegetable, such as lettuce or celery. In another embodiment the crop is a field, grain, or staple crop such as corn, wheat, and/or soybean.

In one aspect, a composition of the invention or a method of the invention is applied to modulate a growth characteristic and/or a health characteristic in a plant from the family Solanaceae. For example, in particular exemplary embodiments the composition or method is applied to tomatoes, peppers, tobacco, and/or potato plants.

The Solanaceae plant family includes a large number of agricultural crops, medicinal plants, spices, and ornamentals in it's over 2,500 species. Taxonomically classified in the Plantae kingdom, Tracheobionta (subkingdom), Spermatophyta (superdivision), Magnoliophyta (division), Manoliopsida (class), Asteridae (subclass), and Solanales (order), the Solanaceae family includes, but is not limited to, potatoes, tomatoes, eggplants, various peppers, tobacco, and petunias. Plants in the Solanaceae can be found on all the continents, excluding *Antarctica*, and thus have a widespread importance in agriculture across the globe.

In another embodiment, a composition of the invention or a method of the invention is applied to modulate a growth characteristic and/or a health characteristic in a plant of the family Cucurbitaceae. In a more particular aspect, the composition or method is applied to promote health and/or growth characteristics in watermelon (or other melon), cucumber, pumpkin, and/or squash.

In one aspect, a composition of the invention or a method of the invention is applied to modulate a growth characteristic and/or a health characteristic in a plant from the family Brassicaeae (or Cruciferae). In specific embodiments the composition or method is applied to modulate one or more plant health and/or growth characteristics in cabbage, broccoli, cauliflower, kale, Brussels sprouts, collard greens, or turnips.

In an additional facet, the invention provides compositions and methods that may be applied to modulate a growth characteristic and/or a health characteristic in a plant from the family Alliaceae (Liliceae). For example, the invention provides compositions and methods for modulating plant characteristics in onions, chives, or garlic.

In a further embodiment, the invention provides compositions and methods that may be applied to modulate one or more growth characteristics and/or health characteristics in a plant from the family Lamiaceae. Examples of this embodiment of the invention include compositions and methods for modulating one or more plant characteristics in mint, basil, rosemary, oregano, or lavender.

In an additional facet, the invention provides compositions and methods that may be applied to modulate a growth characteristic and/or a health characteristic in a plant from the family Apiaceae (Umbelliferae). Illustrative examples of this aspect are compositions and methods for modulating one more growth and/or health characteristics in celery, carrot, or parsley.

Additional aspects of the invention are directed to compositions and methods for modulating plant growth and/or health characteristics in plants from the family Malvaceae (such as okra, cotton, or durian), plants from the family Asteraceae (Compositae) (such as lettuce, safflower, or artichoke), plants from the family Zingieraceae (e.g., ginger), plants from the family Piperaceae (e.g., pepper), and/or plants from the family Caricaceae (e.g., *papaya*).

In another set of embodiments, the invention provides compositions and methods that can modify one or more plant health and/or growth characteristics in plants that are from the monocot clade (as opposed to the dicot clade), such as plants from the family Poaceae. Particular aspects of this set of embodiments include compositions and methods for modulating plant characteristics in grasses such as corn, wheat, sugar, barley, rice, oats, sorghum, millet, and rye, as well as ornamental grasses (lawn turf, sod, etc.).

The Poaceae plant family supplies food, building materials, and feedstock for fuel processing. Taxonomically classified in the Plantae kingdom, Tracheobionta (subkingdom), Spermatophyta (superdivision), Magnoliophyta (division), Liliopsida (class), Commelinidae (subclass), and Cyperales (order), the Poaceae family includes, but is not limited to, flowering plants, grasses, and cereal crops such as barely, corn, lemongrass, millet, oat, rye, rice, wheat, sugarcane, and sorghum. Types of turf grass found in, e.g., the State of Arizona, include, but are not limited to, hybrid Bermuda grasses (e.g., 328 tifgrn, 419 tifway, tif sport), which may be subject to receiving treatment with compositions or methods of the invention.

In some embodiments the composition or method are applied to plants from the family Vitaceae, which includes grapes. The Vitaceae plant family includes other flowering plants and vines. Taxonomically classified in the Plantae kingdom, Tracheobionta (subkingdom), Spermatophyta (superdivision), Magnoliophyta (division), Magnoliopsida (class), Rosidae (subclass), and Rhammales (order), the Vitaceae family includes, but is not limited to, grapes.

In other embodiments the composition or method are applied to plants from the family Roasaceae, which includes roses. The Rosaceae plant family also includes many other important types of flowering plants, herbs, shrubs, and trees. Taxonomically classified in the Plantae kingdom, Tracheobionta (subkingdom), Spermatophyta (superdivision), Magnoliophyta (division), Magnoliopsida (class), Rosidae (subclass), and Rosales (order), the Rosaceae family includes, but is not limited to, plants including almond, apple, apricot, blackberry, cherry, nectarine, peach, plum, raspberry, strawberry, and quince. Thus, for example, the invention provides methods and compositions for modulating one or more plant growth and/or health characteristics in, e.g., strawberries.

In a further facet, the invention provides compositions and methods for modulating a characteristic of a tree plant, such as a plant from the family Anacardiaceae (e.g., a mango, cashew, or pistachio tree), a plant from the family Rutaceae (e.g., an orange, lemon, or other citrus tree), or a plant from the family Ericaceae (e.g., a cranberry or blueberry plant). Other tree plants that may be subject to treatment with methods of the invention and/or compositions of the invention include plants from the families Sapindaceae (e.g., maple trees), Moraceae (e.g., fig trees), Oleaceae (e.g., lilac bushes), Rubiaceae (e.g., coffee), Juglandaceae (e.g., walnut and pecan trees), Muscaceae (e.g., bananas), Areaceae (e.g., dates and other palms), Myristicaceae (e.g., nutmeg), and Lauraceae (e.g., avocado trees).

In still further embodiments the compositions and methods of the invention are applied to plants from the family Bromeliaceae (e.g., pineapple), the family Convolvulaceae (e.g., morning glory), the family Verbenaceae, the family Pedaliaceae, the family Araliaceae, the family Actinidaceae, the family Cactaceae, the family Chenopodiaceae, the family Theaceae, the family Lecythidaceae, the family Papveraceae, the family Illiciaceae, the family Myrtaceae, the family Bertulaceae, the family Asparagaceae (Liliaceae), the family Dioscoreaceae, the family Myristicaceae, the family Annonaceae, the family Euphorbiaceae, or the family Proteaceae.

In yet another set of embodiments the compositions and methods of the invention are applied to plants from the family Polygonaceae. In one aspect, the plant from the family Polygonaceae is commonly classified as a weed (a wild plant growing where it is not wanted and in competition with cultivated plants) and the modulation of plant growth and/or plant health in the weed comprises reducing an aspect of growth, reducing an aspect of health, or both, in the plant.

In another facet, the invention provides methods and compositions for modulating one or more plant growth and/or plant health characteristics in a plant from the family Fabaceae (Leguminosae or Papilionoideae). In one particular embodiment, the method or composition enhances growth and/or health in the legume. In an even more particular embodiment, the method or composition enhances growth and/or health in a bean-producing legume.

The Fabaceae plant family (also known as the Leguminosae) comprises the third largest plant family with over 18,000 species, including a number of important agricultural and food plants. Taxonomically classified in the Plantae kingdom, Tracheobionta (subkingdom), Spermatophyta (superdivision), Magnoliophyta (division), Manoliopsida (class), Rosidae (subclass), and Fabales (order), the Fabaceae family includes, but is not limited to, soybeans, beans, green beans, peas, chickpeas, alfalfa, peanuts, sweet peas, carob, and liquorice. Plants in the Fabaceae family can range in size and type, including but not limited to, trees, small annual herbs, shrubs, and vines, and typically develop legumes. Plants in the Fabaceae family can be found on all the continents, excluding *Antarctica*, and thus have a widespread importance in agriculture across the globe. Besides food, plants in the Fabaceae family can be used to produce natural gums, dyes, and ornamentals.

In any embodiment of the invention in which the modulation of a characteristic in a plant is described the skilled artisan will understand that typically this will also or alternatively mean the modulation of a characteristic in a population of plants, such as modulation of a characteristic a statistically significant amount of time (as determined by tests with a p value of 0.05, 0.02, 0.01, or 0.1) in treated vs. untreated plants (wherein such treated and untreated plants are otherwise substantially similar) and/or modulation of the characteristic in a substantial proportion of a population of treated plants (e.g., at least 10%, at least 15%, at least 20%, at least 25%, at least 33%, at least 40%, at least 50%, at least 65%, at least 75%, or at least 90% of the population).

Often important in the production of fruit from plants is the beginning stage of growth where the plant emerges and matures into establishment. A method of treating a seed, seedling, or plant to directly improve the germination, emergence, and maturation of the plant; or to indirectly enhance the microbial soil community surrounding the seed or seedling is therefore valuable starting the plant on the path to marketable production, and one aspects of the invention is the modulation of such aspects of growth through the methods of the invention and compositions of the invention. The standard typically used for assessing emergence is the achievement of the hypocotyl stage, where a stem is visibly protruding from the soil. The standard typically used for assessing maturation is the achievement of the cotyledon stage, where two leaves visibly form on the emerged stem.

Also important in the production of fruit from plants is the yield and quality of fruit, which may be quantified as the number, weight, color, firmness, ripeness, moisture, degree of insect infestation, degree of disease or rot, and degree of sunburn of the fruit. In one aspect, the invention also or alternatively provides methods of enhancing the yield and/or quality of fruit production in a plant by applying the methods and/or compositions described herein. In a particular aspect, the invention provides methods of increasing the yield of a plant and/or a plant's fruit and/or seed by 2.5% or more, 5% or more, 7.5% or more, 10% or more, 12.5% or more, 15% or more, 17.5% or more, 20% or more, 22.5% or more, 25% or more, 30% or more, 33.33% or more, 35% or more, or even 40% or more, with respect to untreated plants that are substantially similar to the treated plants exhibiting such a change arising from treatment with the composition of the invention. The invention provides similar methods of increasing one or more growth characteristics of plants, in some embodiments, such as increasing root mass, root length, total dry biomass of the plant, and the like. In other aspects, compositions of the invention can reduce one or more characteristics of plant growth and/or plant health by similar percentages, such as reducing total plant biomass, root length, and the like. In some aspects, the invention provides compositions that at one concentration/amount and/or in one type of plant or administration route can reduce one or more plant characteristic and under other plant, administration, or concentration/amount conditions can enhance one or more plant characteristics.

The invention also provides methods of treating a plant to directly improve the characteristics of the plant, for example to modulate the chlorophyll level of the plant, e.g., for enhancing photosynthetic capabilities and/or for modulating the health of the plant's leaves, roots, and shoot, such as to enable robust production of fruit, particularly of marketable fruit. Marketable and unmarketable designations may apply to both the plant and fruit, and may be defined differently based on the end use of the product, such as but not limited to, fresh market produce and processing for inclusion as an ingredient in a composition. The marketable determination may assess such qualities as, but not limited to, color, size, shape, insect damage, blossom end rot, softness, and/or sunburn. The term "total production" means production or yield that incorporates both marketable and unmarketable plants and/or fruit. The ratio of marketable plants or fruit to unmarketable plants or fruit may be referred to as "utilization" and expressed as a percentage. The utilization may be used as an indicator of the efficiency of the agricultural process as it shows the successful production of marketable plants or fruit, which will be obtain the highest financial return for the grower, whereas total production will not provide such an indication.

To achieve such improvements in emergence, maturation, and yield of plants, the inventors have now invented methods to treat such plants, directly or indirectly (e.g., the latter by treating the soil), in the seed stage, juvenile stage, and/or mature stage, with a low concentration macroalgae based composition, in a solid or liquid solution form. In certain and often preferred embodiments, the macroalgae composition comprises microalgae material obtained from a species of *Kappaphycus*, such as *Kappaphycus alvarezzi*.

In some embodiments, harvested *Kappaphycus* may subjected to downstream processing and the resulting extract may be used in a composition, which may be a dried composition (e.g., powder, pellet) or a liquid composition (e.g., suspension, solution, etc., such as a foliar spray) for application to plants (as seeds, seedlings, or mature plants), soil, or a combination thereof. Non-limiting examples of downstream processing that may be applied in this respect comprise: drying the plants, lysing the plants, and subjecting the harvested plants to a solvent or supercritical carbon dioxide extraction process to isolate an oil or protein. In some embodiments, the extracted (i.e., residual) biomass remaining from an extraction process may be used alone or in combination with other biomass or extracts in a liquid composition for application to plants, soil, or a combination thereof. By subjecting the *Kappaphycus* to an extraction process the resulting biomass is transformed from a natural whole state to a lysed condition where the cell is missing a significant amount of the natural components, thus differentiating the extracted *Kappaphycus* biomass from that which is found in nature.

In some embodiments, *Kappaphycus* material may be the dominate active ingredient source in the composition. "Active ingredient" in this respect means ingredient responsible for either any bio-stimulatory effect or, if specified, the specific bio-stimulatory effect of the composition (e.g., modulating plant growth, modulating plant health, or both). In some embodiments, the *Kappaphycus* material comprises at least 99% of the active ingredient sources of the composition (such as at least 99.5% or at least 99.9%). In some embodiments, the *Kappaphycus* material comprises at least 95% of the active ingredient sources of the composition (such as at least 97%, at least 98%, or at least 98.5%). In some embodiments, *Kappaphycus* active ingredient(s) comprise(s) at least 90% of the active ingredient sources of the composition. In some embodiments, *Kappaphycus* active ingredient material comprises at least 80% of the active ingredient sources of the composition. In some embodiments, *Kappaphycus* active ingredient material comprises at least 70% of the active ingredient sources of the composition. In some embodiments, *Kappaphycus* active ingredient material comprises at least 60% of the active ingredient sources of the composition. In some embodiments, *Kappaphycus* active ingredient material comprises at least 50% of the active ingredient sources of the composition. In some embodiments, *Kappaphycus* active ingredient material comprises at least 40% of the active ingredient sources of the composition. In some embodiments, *Kappaphycus* material comprises at least 30% of the active ingredient sources of the composition.

In some embodiments, *Kappaphycus* material comprises at least 20% of the active ingredient sources of the composition (e.g., *Kappaphycus* material comprises 20-50% of the active ingredient material in the composition). In some embodiments, *Kappaphycus* comprises at least 10% of the active ingredient sources of the composition. In some embodiments, *Kappaphycus* comprises at least 5% of the active ingredient sources of the composition. In some embodiments, *Kappaphycus* comprises at least 1% of the active ingredient sources of the composition (e.g., *Kappaphycus* material may comprise 1-10%, 1-20%, 1-33%, 1-50%, 5-50%, 5-75%, 10-100%, 10-90%, 20-90%, or 20-100% of the active material in the composition). In some embodiments, the composition lacks any detectable amount of any other active ingredient other than the *Kappaphycus* material.

In some embodiments, compositions of the invention, such as a composition comprising one or more extracts of one or more *Kappaphycus* species or sub-species groups may also be mixed with materials obtained from, such as extracts from, other plants, algae, microalgae, macroalgae, seaweeds, and kelp, and also or alternatively the *Kappaphycus* composition(s) can be combined with other bio-stimulant materials, such as bio-stimulatory bacteria, bacterial products, or organic materials (such as humic acid, humates, lignites, chitins, and/or other known bio-stimulatory materials). In some embodiments, *Kappaphycus* extracts may also be mixed with fish oil. Non-limiting examples of algae and/or algae-like organisms that may be processed through extraction and combined with *Kappaphycus* may comprise species of *Lemna, Gracilaria, Macrocystis, Fucus, Laminaria, Sargassum, Turbinaria*, and *Durvilea*. In further embodiments, the composition, such as the extracts may comprise, but are not limited to, liquid extract from a species of *Ascophyllum*.

In some embodiments, the inventive composition comprising active *Kappaphycus* material (e.g., one or more *Kappaphycus* extract(s) that form part of or all of the active ingredient portion of the composition), comprises 50% or less by volume of the entire composition in which it is contained. In some embodiments, the active ingredient components or extracts may comprise 40% or less by volume of the total composition. In some embodiments, the active ingredient components or extracts may comprise 30% or less by volume of the composition. In some embodiments, the active ingredient components or extracts may comprise 20% or less by volume of the composition.

As noted already and as further described herein, in some aspects the *Kappaphycus* material is an extract obtained from *Kappaphycus*, which may be obtained through chemical extraction or extraction by any other suitable means. However, the *Kappaphycus* composition can be any suitable type of composition, which might include a suspension of *Kappaphycus* material, for example, or a material obtained from other methods of processing *Kappaphycus* material, such as grinding, pressing, and the like. In some aspects, the composition comprise a synthetic compound that is derived from one or more *Kappaphycus* compounds, such as those compounds present in an extract, or comprises one more bioequivalent synthetic compounds to compounds that are in *Kappaphycus* and are bio-stimulatory.

In additional embodiments of the invention, the active ingredient component(s) of the composition, such as the extracts of one or more macroalgae (typically including at least one extract from *Kappaphycus*) may comprise 10% or less of the composition by volume. In some embodiments, such one or more active ingredient components active ingredient components or extracts may comprise 5% or less by volume of the composition. In still further embodiments, the active ingredient components or extracts may comprise 4% or less by volume of the composition. In some embodiments, the active ingredient components or extracts may comprise 3% or less by volume of the composition. In further specified embodiments, the active ingredient components or extracts may comprise 2% or less by volume of the composition. In additional embodiments, the the active ingredient components or extracts may comprise 1% or less by volume of the composition.

In some aspects of the invention, in addition to the macroalgae component(s) the composition further comprises one or more microalgae components, which may also be active components. The microalgae components can be extracts, secretions (such as extracellular polysaccharide fractions), fragments, or whole cells of microalgae, or a combination of such materials. The term "microalgae" refers to microscopic single cell organisms that are typically subject to classification as "algae", such as microalgae, cyanobacteria, algae, diatoms, dinoflagelattes, freshwater organisms, marine organisms, or other similar single cell organisms capable of growth in phototrophic, mixotrophic, or heterotrophic culture conditions.

In some embodiments, *Kappaphycus* compositions such as extracts from *Kappaphycus alvarezzi* may also be mixed with microalgae based biomass (cells, whether isolated or in some kind of culture form that typically has been processed through centrifugation, flocculation, or other method), fragments, secretions, or extracts, such as but not limited to microalgae materials from organisms of the genus *Chlorella*, to make a composition that is beneficial when applied to plants or soil. Non-limiting examples of microalgae that can be used in the compositions and methods of the present invention comprise microalgae in the classes: Eustigmatophyceae, Chlorophyceae, Prasinophyceae, Haptophyceae, Cyanidiophyceae, Prymnesiophyceae, Porphyridiophyceae, Labyrinthulomycetes, Trebouxiophyceae, Bacillariophyceae, and Cyanophyceae. The class Cyanidiophyceae includes species of *Galdieria*. The class Chlorophyceae includes species of *Haematococcus, Scenedesmus, Chlamydomonas*, and *Micractinium*. The class Prymnesiophyceae includes species of *Isochrysis* and *Pavlova*. The class Eustigmatophyceae includes species of *Nannochloropsis*. The class Porphyridiophyceae includes species of *Porphyridium*. The class Labyrinthulomycetes includes species of *Schizochytrium* and *Aurantiochytrium*. The class Prasinophyceae includes species of *Tetraselmis*. The class Trebouxiophyceae includes species of *Chlorella*. The class Bacillariophyceae includes species of *Phaeodactylum*. The class Cyanophyceae includes species of *Spirulina*.

Non-limiting examples of microalgae genus and species that can be used in the compositions and methods of the present invention include: *Achnanthes orientalis, Agmenellum* spp., *Amphiprora hyaline, Amphora coffeiformis, Amphora coffeiformis* var. *linea, Amphora coffeiformis* var. *punctata, Amphora coffeiformis* var. *taylori, Amphora coffeiformis* var. *tenuis, Amphora delicatissima, Amphora delicatissima* var. *capitata, Amphora* sp., *Anabaena, Ankistrodesmus, Ankistrodesmus falcatus, Aurantiochytrium* sp., *Boekelovia hooglandii, Borodinella* sp., *Botryococcus braunii, Botryococcus sudeticus, Bracteococcus minor, Bracteococcus medionucleatus, Carteria, Chaetoceros gracilis, Chaetoceros muelleri, Chaetoceros muelleri* var. *subsalsum, Chaetoceros* sp., *Chlamydomonas* sp., *Chlamydomas perigranulata, Chlorella anitrata, Chlorella antarctica, Chlorella aureoviridis, Chlorella Candida, Chlorella capsulate, Chlorella desiccate, Chlorella ellipsoidea, Chlorella emersonii, Chlorella fusca, Chlorella fusca* var. *vacuolate, Chlorella glucotropha, Chlorella infusionum, Chlorella infusionum* var. *actophila, Chlorella infusionum* var. *auxenophila, Chlorella kessleri, Chlorella lobophora, Chlorella luteoviridis, Chlorella luteoviridis* var. *aureoviridis, Chlorella luteoviridis* var. *lutescens, Chlorella miniata, Chlorella minutissima, Chlorella mutabilis, Chlorella nocturna, Chlorella ovalis, Chlorella parva, Chlorella photophila, Chlorella pringsheimii, Chlorella protothecoides, Chlorella protothecoides* var. *acidicola, Chlorella regularis, Chlorella regularis* var. *minima, Chlorella regularis* var. *umbricata, Chlorella reisiglii, Chlorella saccharophila, Chlorella saccharophila* var. *ellipsoidea, Chlorella salina, Chlorella simplex, Chlorella sorokiniana, Chlorella* sp., *Chlorella sphaerica, Chlorella stigmatophora, Chlorella vanniellii, Chlorella vulgaris, Chlorella vulgaris* fo. *tertia, Chlorella vulgaris* var. *autotrophica, Chlorella vulgaris* var. *viridis, Chlorella vulgaris* var. *vulgaris, Chlorella vulgaris* var. *vulgaris* fo. *tertia, Chlorella vulgaris* var. *vulgaris* fo. *viridis, Chlorella xanthella, Chlorella zofingiensis, Chlorella trebouxioides, Chlorella vulgaris, Chlorococcum infusionum, Chlorococcum* sp., *Chlorogonium, Chroomonas* sp., *Chrysosphaera* sp., *Cricosphaera* sp., *Crypthecodinium cohnii, Cryptomonas* sp., *Cyclotella cryptica, Cyclotella meneghiniana, Cyclotella* sp., *Dunaliella* sp., *Dunaliella bardawil, Dunaliella bioculata, Dunaliella granulate, Dunaliella maritime, Dunaliella minuta, Dunaliella parva, Dunaliella peircei, Dunaliella primolecta, Dunaliella salina, Dunaliella terricola, Dunaliella tertiolecta, Dunaliella viridis, Dunaliella tertiolecta, Eremosphaera viridis, Eremosphaera* sp., *Ellipsoidon* sp., *Euglena* spp., *Franceia* sp., *Fragilaria crotonensis, Fragilaria* sp., *Galdieria* sp., *Gleocapsa* sp., *Gloeothamnion* sp., *Haematococcus pluvialis, Hymenomonas* sp., *Isochrysis aff galbana, Isochrysis galbana, Lepocinclis, Micractinium, Monoraphidium minutum, Monoraphidium* sp., *Nannochloris* sp., *Nannochloropsis salina, Nannochloropsis* sp., *Navicula acceptata, Navicula biskanterae, Navicula pseudotenelloides, Navicula pelliculosa, Navicula saprophila, Navicula* sp., *Nephrochloris* sp., *Nephroselmis* sp., *Nitschia communis, Nitzschia alexandrina, Nitzschia closterium, Nitzschia communis, Nitzschia dissipata, Nitzschia frustulum, Nitzschia hantzschiana, Nitzschia inconspicua, Nitzschia intermedia, Nitzschia microcephala, Nitzschia pusilla, Nitzschia pusilla elliptica, Nitzschia pusilla monoensis, Nitzschia quadrangular, Nitzschia* sp., *Ochromonas* sp., *Oocystis parva, Oocystis pusilla, Oocystis* sp., *Oscillatoria limnetica, Oscillatoria* sp., *Oscillatoria subbrevis, Parachlorella kessleri, Pascheria acidophila, Pavlova* sp., *Phaeodactylum tricomutum, Phagus, Phormidium, Platymonas* sp., *Pleurochrysis camerae, Pleurochrysis dentate, Pleurochrysis* sp., *Porphyridium* sp., *Prototheca wickerhamii, Prototheca stagnora, Prototheca portoricensis, Prototheca moriformis, Prototheca zopfii, Pseudochlorella aquatica, Pyramimonas* sp., *Pyrobotrys, Rhodococcus opacus, Sarcinoid chrysophyte, Scenedesmus armatus, Schizochytrium, Spirogyra, Spirulina platensis, Stichococcus* sp., *Synechococcus* sp., *Synechocystisf, Tagetes erecta, Tagetes patula, Tetraedron, Tetraselmis* sp., *Tetraselmis suecica, Thalassiosira weissflogii*, and *Viridiella fridericiana*.

Those of skill in the art will recognize that *Chlorella* and *Micractinium* appear closely related in many taxonomic classification trees for microalgae, and strains and species may be re-classified from time to time. Thus for references throughout the instant specification for *Chlorella*, it is recognized that microalgae strains in related taxonomic classifications with similar characteristics to *Chlorella* would reasonably be expected to produce similar results.

Additionally, taxonomic classification has also been in flux for organisms in the genus *Schizochytrium*. Some organisms previously classified as *Schizochytrium* have been reclassified as *Aurantiochytrium, Thraustochytrium*, or *Oblongichytrium*. See Yokoyama et al. Taxonomic rearrangement of the genus *Schizochytrium* sensu lato based on morphology, chemotaxonomic characteristics, and 18S rRNA gene phylogeny (Thrausochytriaceae, Labyrinthulomycetes): emendation for *Schizochytrium* and erection of *Aurantiochytrium* and *Oblongichytrium* gen. nov. *Mycoscience* (2007) 48:199-211. Those of skill in the art will recognize that *Schizochytrium, Aurantiochytrium, Thraustochytrium*, and *Oblongichytrium* appear closely related in many taxonomic classification trees for microalgae, and strains and species may be re-classified from time to time. Thus for references throughout the instant specification for

*Schizochytrium*, it is recognized that microalgae strains in related taxonomic classifications with similar characteristics to *Schizochytrium* would reasonably be expected to produce similar results and such alternate embodiments will be understood to be provided by this disclosure. Microalgae that produce valuable oil products, such as *Schizochytrium* or *Haematococcus*, which produce DHA and astaxanthin, respectively, often are subjected to extraction processes and the microalgae material that is the remainder of such an extraction process can be used as active and/or inactive ingredients in the composition and methods of the invention.

In one embodiment, *Chlorella* sp. or other type of *Chlorella* microalgae produced for inclusion in a composition of the invention or for administration with a *Kappaphycus* active ingredient composition of the invention may be cultured in mixotrophic conditions, which comprises a culture medium primary comprised of water with trace nutrients (e.g., nitrates, phosphates, vitamins, metals found in BG-11 recipe (available from UTEX The Culture Collection of Algae at the University of Texas at Austin, Austin, Tex.)), light as an energy source for photosynthesis, organic carbon (e.g., acetate, acetic acid) as both an energy source and a source of carbon. In some embodiments, the culture media may comprise BG-11 media or a media derived from BG-11 culture media (e.g., in which additional component(s) are added to the media and/or one or more elements of the media is increased by 5%, 10%, 15%, 20%, 25%, 33%, 50%, or more over unmodified BG-11 media). In some embodiments, the *Chlorella* may be cultured in non-axenic mixotrophic conditions in the presence of contaminating organisms, such as but not limited to bacteria. Methods of culturing such microalgae in non-axenic mixotrophic conditions may be found in WO2014/074769A2 (Ganuza, et al.), hereby incorporated by reference.

By artificially controlling aspects of the *Chlorella* culturing process such as the organic carbon feed (e.g., acetic acid, acetate), oxygen levels, pH, and light, the culturing process differs from the culturing process that *Chlorella* experiences in nature. In addition to controlling various aspects of the culturing process, intervention by human operators or automated systems occurs during the non-axenic mixotrophic culturing of *Chlorella* through contamination control methods to prevent the *Chlorella* from being overrun and outcompeted by contaminating organisms (e.g., fungi, bacteria). Contamination control methods for microalgae cultures are known in the art and such suitable contamination control methods for non-axenic mixotrophic microalgae cultures are disclosed in WO2014/074769A2 (Ganuza, et al.), hereby incorporated by reference. By intervening in the microalgae culturing process, the impact of the contaminating microorganisms can be mitigated by suppressing the proliferation of containing organism populations and the effect on the microalgal cells (e.g., lysing, infection, death, clumping). Thus through artificial control of aspects of the culturing process and intervening in the culturing process with contamination control methods, the *Chlorella* culture produced as a whole and used in the described inventive compositions differs from the culture that results from a *Chlorella* culturing process that occurs in nature.

During the mixotrophic culturing process the *Chlorella* culture may also comprise cell debris and compounds excreted from the *Chlorella* cells into the culture medium. The output of the *Chlorella* mixotrophic culturing process provides the active ingredient for composition that is applied to plants for improving yield and quality without separate addition to or supplementation of the composition with other active ingredients not found in the mixotrophic *Chlorella* whole cells and accompanying culture medium from the mixotrophic culturing process such as, but not limited to: non-*Chlorella* microalgae cells, microalgae extracts, macroalgae, macroalgae extracts, liquid fertilizers, granular fertilizers, mineral complexes (e.g., calcium, sodium, zinc, manganese, cobalt, silicon), fungi, bacteria, nematodes, protozoa, digestate solids, chemicals (e.g., ethanolamine, borax, boric acid), humic acid, nitrogen and nitrogen derivatives, phosphorus rock, pesticides, herbicides, insecticides, enzymes, plant fiber (e.g., coconut fiber).

In some embodiments, the mixotrophic *Chlorella* may be previously frozen and thawed before inclusion in the liquid composition. In some embodiments, the mixotrophic *Chlorella* may not have been subjected to a previous freezing or thawing process. In some embodiments, the mixotrophic *Chlorella* whole cells have not been subjected to a drying process. The cell walls of the mixotrophic *Chlorella* of the composition have not been lysed or disrupted, and the mixotrophic *Chlorella* cells have not been subjected to an extraction process or process that pulverizes the cells. The mixotrophic *Chlorella* whole cells are not subjected to a purification process for isolating the mixotrophic *Chlorella* whole cells from the accompanying constituents of the culturing process (e.g., trace nutrients, residual organic carbon, bacteria, cell debris, cell excretions), and thus the whole output from the mixotrophic *Chlorella* culturing process comprising whole *Chlorella* cells, culture medium, cell excretions, cell debris, bacteria, residual organic carbon, and trace nutrients, is used in the liquid composition for application to plants. In some embodiments, the mixotrophic *Chlorella* whole cells and the accompanying constituents of the culturing process are concentrated in the composition. In some embodiments, the mixotrophic *Chlorella* whole cells and the accompanying constituents of the culturing process are diluted in the composition to a low concentration. The mixotrophic *Chlorella* whole cells of the composition are not fossilized. In some embodiments, the mixotrophic *Chlorella* whole cells are not maintained in a viable state in the composition for continued growth after the method of using the composition in a soil or foliar application. In some embodiments, the mixotrophic *Chlorella* base composition may be biologically inactive after the composition is prepared. In some embodiments, the mixotrophic *Chlorella* base composition may be substantially biologically inactive after the composition is prepared. In some embodiments, the mixotrophic *Chlorella* base composition may increase in biological activity after the prepared composition is exposed to air.

In some embodiments, a liquid composition may comprise low concentrations of bacteria contributing to the solids percentage of the composition in addition to the whole mixotrophic *Chlorella* cells. Examples of bacteria found in non-axenic mixotrophic conditions may be found in WO2014/074769A2 (Ganuza, et al.), hereby incorporated by reference. A live bacteria count may be determined using methods known in the art such as plate counts, plates counts using Petrifilm available from 3M (St. Paul, Minn.), spectrophotometric (turbidimetric) measurements, visual comparison of turbidity with a known standard, direct cell counts under a microscope, cell mass determination, and measurement of cellular activity. Live bacteria counts in a non-axenic mixotrophic microalgae culture may range from $10^4$ to $10^9$ CFU/mL, and may depend on contamination control measures taken during the culturing of the microalgae. The level of bacteria in the composition may be determined by an aerobic plate count which quantifies aerobic colony forming units (CFU) in a designated volume. In some embodiments, the composition comprises an aerobic plate count of 40,000-400,000 CFU/mL. In some embodiments, the composition comprises an aerobic plate count of 40,000-100,000 CFU/mL. In some embodiments, the composition comprises an aerobic plate count of 100,000-200,000 CFU/mL. In some embodiments, the composition comprises an aerobic plate count of 200,000-300,000 CFU/mL. In some embodiments, the composition comprises an aerobic plate count of 300,000-400,000 CFU/mL.

In some embodiments, the macroalgae based composition can be supplemented with a supplemental nutrient such as nitrogen, phosphorus, or potassium to increase the levels within the composition to at least 1% of the total composition (i.e., addition of N, P, or K to increase levels at least 1-0-0, 0-1-0, 0-0-1, or combinations thereof). In some embodiments, the macroalgae composition may be supplemented with nutrients such as, but not limited to, calcium, magnesium, silicon, sulfur, iron, manganese, zinc, copper, boron, molybdenum, chlorine, sodium, aluminum, vanadium, nickel, cerium, dysprosium, erbium, europium, gadolinium, holmium, lanthanum, lutetium, neodymium, praseodymium, promethium, samarium, scandium, terbium, thulium, ytterbium, and yttrium. In some embodiments, the supplemented nutrient is not uptaken, chelated, or absorbed by the microalgae. In some embodiments, the concentration of the supplemental nutrient may comprise 1-50 g per 100 g of the composition.

In one aspect, the invention provides compositions such as those described above that are stabilized by one or more processes and/or stabilizing agents. For example, a liquid composition comprising *Kappaphycus* material, such as a blend of *Kappaphycus* and other macroalgae extracts, may be stabilized by heating and cooling in a pasteurization process. As shown in the Examples, the inventors found that the active ingredients of the *Kappaphycus* based composition maintained effectiveness in at least one characteristic of a plant after being subjected to the heating and cooling of a pasteurization process. In other embodiments, liquid compositions containing biomass or extracts of *Kappaphycus* may not need to be stabilized by pasteurization. For example, *Kappaphycus* biomass that have been processed, such as by drying, lysing, and extraction, or extracts may comprise such low levels of bacteria that a liquid composition may remain stable without being subjected to the heating and cooling of a pasteurization process.

In embodiments in which a pasteurized *Kappaphycus* composition is included in the composition, the composition or the *Kappaphycus* portion thereof may be heated to a temperature in the range of 50-70° C. for a period of time that is sufficient to achieve the level of desired pasteurization, examples of which are provided below. In some embodiments, the composition or portion may be heated to a temperature in the range of 55-65° C. for the desired time. In some embodiments, the composition may be heated to a temperature in the range of 58-62° C. for the desired period. In another set of embodiments, the composition may be heated to a temperature in the range of 50-60° C. In still other embodiments, the composition may be heated to a temperature in the range of 60-70° C. The composition or component that is pasteurized may comprise the *Kappaphycus* material alone or with other materials, such as microalgae materials.

In some embodiments, the composition or the component that is to be pasteurized according to certain aspects of the invention may be heated for a time period in the range of 90-150 minutes. In some embodiments, the composition may be heated for a time period in the range of 110-130 minutes. In still other embodiments, the composition may be heated for a time period in the range of 90-100 minutes. In alternative embodiments, the composition may be heated for a time period in the range of 100-110 minutes. In more specific embodiments, the composition may be heated for a time period in the range of 110-120 minutes. In other embodiments, the composition may be heated for a time period in the range of 120-130 minutes. In still other, specific embodiments, the composition may be heated for a time period in the range of 130-140 minutes. And, in some additional specific embodiments, the composition may be heated for a time period in the range of 140-150 minutes.

With respect to compositions that are pasteurized or that comprise pasteurized components, when the step of heating or subjecting the liquid composition to high temperatures is complete, the compositions or components may be cooled at any rate to a temperature that is desired or suitable for the conditions of working with the composition or component. In one non-limiting embodiment, the composition or component may be cooled to a temperature in the range of 35-45° C. prior to further work with the composition or component. In some embodiments, the composition or component may be cooled to a temperature in the range of 36-44° C. before further work is performed with the composition or component. In some embodiments, the composition or component may be cooled to a temperature in the range of 37-43° C. In some embodiments, the composition or component may be cooled to a temperature in the range of 38-42° C. In some embodiments, the composition or component may be cooled to a temperature in the range of 39-41° C. In further embodiments, the pasteurization process may be part of a continuous production process that also involves packaging, and thus the liquid composition may be packaged (e.g., bottled) directly after the heating or high temperature stage without a cooling step.

The compositions of the invention can comprise any suitable amount of *Kappaphycus* active ingredient, which often will be in the form of one or more *Kappaphycus* extracts, which optionally may be combined with microalgae extracts or other materials. In some embodiments, the composition may comprise 5-30% by weight of *Kappaphycus* extracts (i.e., 5-30 g of *Kappaphycus* extracts/100 mL of the liquid composition). In other embodiments, the composition may comprise 5-20% by weight of *Kappaphycus* extracts. In still further embodiments, the composition may comprise 5-15% by weight of *Kappaphycus* extracts. Additional embodiments provide that the composition may comprise 5-10% by weight of *Kappaphycus* extracts. In some embodiments, the composition may comprise 10-20% by weight of *Kappaphycus* extract or other *Kappaphycus* material, 20-30% by weight of *Kappaphycus* extracts or other *Kappaphycus* materials. In some embodiments, further dilution of a *Kappaphycus* extract or other *Kappaphycus* active ingredient may be occur before application for low concentration applications of such active ingredients.

In some embodiments, the composition may comprise less than 1% by weight of *Kappaphycus* macroalgae active ingredient(s), such as one or more macroalgae extracts (e.g., the composition may be characterized in comprising less than 1 g of macroalgae derived product/100 mL of total liquid composition). In some embodiments, the composition may comprise less than 0.9% by weight of macroalgae composition, such as *Kappaphycus* extract or extracts. In some embodiments, the composition may comprise less than 0.8% by weight of macroalgae extract or other composition. In some embodiments, the composition may comprise less than 0.7% by weight of macroalgae extract or other composition. In some embodiments, the composition may comprise less than 0.6% by weight of *Kappaphycus* macroalgae extract or other composition. In some embodiments, the composition may comprise less than 0.5% by weight of macroalgae extract or other composition.

In still more particular embodiments, the composition may comprise less than 0.4% by weight of macroalgae active ingredient composition. In some more particular embodiments, the composition may comprise less than 0.3% by weight of macroalgae composition, such as one or more *Kappaphycus* extracts. In some embodiments, the composition may comprise less than 0.2% by weight of macroalgae extract or other composition.

In still more particular embodiments, a composition of the invention may comprise less than 0.1% by weight of *Kappaphycus* composition, such as one or more *Kappaphycus* extracts. In some exemplary embodiments, the composition may comprise at least 0.0001% by weight of *Kappaphycus* extracts or other composition(s). In still more particular embodiments, the composition may comprise at least 0.001% by weight of *Kappaphycus* extracts or other composition, such as 0.001%-0.1% by weight. In some embodiments, the composition may comprise at least 0.01% by weight of *Kappaphycus* extracts or other composition (e.g., at least 0.02%, 0.025%, 0.05%, 0.075%, or an amount in a defined range such as 0.02%-0.1%, 0.025%-0.1%, 0.033%-0.1%, or 0.05%-0.1% of the composition by weight). In some embodiments, the composition may comprise 0.00001-1% by weight of *Kappaphycus* extracts or other *Kappaphycus* composition, such as one or more *Kappaphycus* extracts (e.g., the composition may comprise 0.000025-1%, 0.000033-1%, 0.00005-1%, 0.000075-1%, 0.0001-1%, 0.00025-1%, 0.0005-1%, 0.00075-1%, 0.001-1%, 0.0025-1%, 0.005-1%, 0.0075-1%, 0.00001-0001%, 0.00001-0005%, 0.00001-00075%, 0.00001-001%. 0.00001-0025%, 0.00001-005%, 0.00001-0075%, 0.00001-01%, 0.00001-025%, 0.00001-005%, or 0.00001-0075% *Kappaphycus* active ingredient(s) by weight). In some embodiments, the composition may comprise 0.0001-0.001% by weight of *Kappaphycus* composition or *Kappaphycus* extracts. In some embodiments, the composition may comprise 0.001-0.01% by weight of *Kappaphycus* extracts or *Kappaphycus* material of a different nature. In some embodiments, the composition may comprise 0.01-0.1% by weight of *Kappaphycus* extracts or other *Kappaphycus* material. In some embodiments, the composition may comprise 0.1-1% by weight of *Kappaphycus* extracts or materials.

In some embodiments, an application concentration of 0.1% of *Kappaphycus* extracts equates to 0.04 g of *Kappaphycus* extracts in 40 mL of a composition. In some aspects, the composition is concentrated with respect to the amount of active material(s) that is/are applied to a plant in performing the inventive method. For example, while the desired application concentration to a plant may comprise delivering a composition comprising 0.1% of *Kappaphycus* extract (by weight), the composition may be packaged as a 10% *Kappaphycus* extract concentration (0.4 mL in 40 mL of a composition). Thus, a desired application concentration of 0.1% could, for example, require 6,000 mL of the 10% *Kappaphycus* extracts or other *Kappaphycus* material in 100 gallons of water, which may be applied to about 15,000 plants in an acre, which is equivalent to an application rate of about 1.585 gallons per acre. In some embodiments, a desired application concentration of 0.01% of *Kappaphycus* extracts or other *Kappaphycus* material using a 10% concentration composition equates to an application rate of about 0.159 gallons per acre. In some embodiments, a desired application concentration of 0.001% of *Kappaphycus* extracts or other composition using a 10% concentration composition equates to an application rate of about 0.016 gallons per acre. In some embodiments, a desired application concentration of 0.0001% of *Kappaphycus* extracts or other *Kappaphycus* using a 10% concentration composition equates to an application rate of about 0.002 gallons per acre. The application rate can alternatively be selected from a range of suitable application rates of e.g., 0.0025 gal/acre to 2.5 gal/acre, such as 0.005 gal/acre to 2 gal/acre, e.g., 0.01 gal/acre to 1.75 gal/acre, 0.05 gal/acre to 1.5 gal/acre, 0.1 gal/acre to 1.5 gal/acre, 0.25 gal/acre to 1.25 gal/acre, or 0.5-1 gal acre, for, e.g., a composition that comprises 5%, 7.5%, 10%, 12.5%, or 20% concentrated concentration of active ingredients, which can similarly be reduced to the desired application of, e.g., 0.01% *Kappaphycus* active ingredient, 0.05% *Kappaphycus* active ingredient, or 0.1% *Kappaphycus* active ingredient, through dilution with water.

In another non-limiting embodiment, correlating the application of the macroalgae extracts on a per plant basis using the assumption of 15,000 plants per acre, the composition application rate of 1 gallon per acre is equal to about 0.25 mL per plant=0.025 g per plant=25 mg of macroalgae extracts per plant. The water requirement assumption of 100 gallons per acre is equal to about 35 mL of water per plant. Therefore, 0.025 g of macroalgae extracts in 35 mL of water is equal to about 0.071 g of macroalgae extracts per 100 mL of composition equates to about a 0.07% application concentration. In some embodiments, the macroalgae extracts based composition may be applied at a rate in a range as low as about 0.001-10 gallons per acre, or as high as up to 150 gallons per acre, but often will be applied in a narrower range such as 0.01-10 gal/acre, such as 0.1-5 gal/acre, 0.25-2.5 gal/acre, or 0.5-1.5 gal/acre.

In some embodiments, stabilizing agents that are not active regarding the improvement of plant germination, emergence, maturation, quality, and yield, but instead aid in stabilizing the composition may be added to prevent the proliferation of unwanted microorganisms (e.g., yeast, mold) and prolong shelf life. Such inactive but stabilizing agents may comprise an acid, such as but not limited to phosphoric acid or citric acid, and a yeast and mold inhibitor, such as but not limited to potassium sorbate. In some embodiments, the stabilizing agents are suitable for plants and do not inhibit the growth or health of the plant. In the alternative, the stabilizing agents may contribute to nutritional properties of the liquid composition, such as but not limited to, the levels of nitrogen, phosphorus, or potassium. Such stabilizing agents and stabilizing methods, such as pasteurization methods described elsewhere herein, may be considered stabilizing means.

Stabilized compositions of the invention can comprise any suitable amount of stabilizing agent. In one exemplary set of embodiments, the composition may comprise phosphoric acid as a stabilizing agent, typically less than 0.3% phosphoric acid, but in an amount that is capable of detectably stabilizing the composition against degradation and/or growth of contaminating organisms, typically bacteria. In some embodiments, compositions are provided that comprise 0.01-0.3% phosphoric acid. In other embodiments, a composition may comprise 0.05-0.25% phosphoric acid. In still further embodiments, a composition may comprise 0.01-0.1% phosphoric acid. In additional embodiments, a composition comprising 0.1-0.2% phosphoric acid as a stabilizing agent is provided. In some embodiments, a composition may comprise 0.2-0.3% phosphoric acid.

In other embodiments, the composition also or alternatively comprises citric acid as a stabilizing agent. In some embodiments, a composition may comprise less than 0.3% citric acid, but a sufficient amount that alone or in combination with other stabilizing agents detectably stabilizes the composition, typically by detectably reducing the rate of bacterial growth in the composition. In some embodiments, the composition may comprise 0.01-0.3% citric acid. In some embodiments, the composition may comprise 0.05-0.25% citric acid. In some embodiments, the composition may comprise 0.01-0.1% citric acid. In some embodiments, the composition may comprise 0.1-0.2% citric acid. In some embodiments, the composition may comprise 0.2-0.3% citric acid.

In another facet, the invention provides compositions comprising potassium sorbate as a stabilizing agent, alone or in combination with other stabilizing agents. In some embodiments, the invention provides a composition comprising less than 0.5% potassium sorbate, but having an amount of potassium sorbate that alone or in combination with other active agents stabilizes the composition, such as by inhibiting the growth of bacteria in the composition as compared to a control. In some embodiments, the composition may comprise 0.01-0.5% potassium sorbate. In some embodiments, the composition may comprise 0.05-0.4% potassium sorbate. In some embodiments, the composition may comprise 0.01-0.1% potassium sorbate. In some embodiments, the composition may comprise 0.1-0.2% potassium sorbate. In some embodiments, the composition may comprise 0.2-0.3% potassium sorbate. In some embodiments, the composition may comprise 0.3-0.4% potassium sorbate. In some embodiments, the composition may comprise 0.4-0.5% potassium sorbate.

The stabilizing agent and/or stabilizing method applied to any stabilized composition of the invention desirably does not reduce the activity of the active ingredient component of the composition, or at least does not reduce the activity of the active ingredient component by more than 25%, more than 20%, more than 17.5%, more than 15%, more than 12.5%, more than 10%, more than 7.5%, more than 5%, more than 2.5%, or more than 1%.

In some embodiments, the composition is a liquid and is substantially aqueous (composed of water). In some embodiments, the invention provides a liquid composition that comprises 70-99% water. In some embodiments, the composition may comprise 85-95% water. In some embodiments, the composition may comprise 70-75% water. In some embodiments, the composition may comprise 75-80% water. In some embodiments, the composition may comprise 80-85% water. In some embodiments, the composition may comprise 85-90% water. In some embodiments, the composition may comprise 90-95% water. In some embodiments, the composition may comprise 95-99% water. The liquid nature and high-water content of such compositions facilitates administration of the composition in a variety of manners, such as but not limit to: flowing through an irrigation system, flowing through an above ground drip irrigation system, flowing through a buried drip irrigation system, flowing through a central pivot irrigation system, sprayers, sprinklers, and water cans, typically without resulting in blockage of a standard drip line, sprayer, or pivot system (e.g., applying the composition through such a system results in blockage less than 99% of the time, less than 99.5% of the time, or less than 99.9% of the time, over a number of applications, such as 100 applications, 1,000 applications, 2,000 applications, 5,000 applications, 10,000 applications, or more than 10,000 applications).

In some embodiments, a liquid composition comprising *Kappaphycus* active ingredient(s) according to the invention is used or is usable or is intended for use relatively immediately after formulation (e.g., within one week or less of formulation, such as 3 days or less, 2 days or less, or even the same day as formulation). Alternatively, and more typically, compositions of the invention may be stored in one or more suitable containers for later use (e.g., totes, bottles, and/or jugs in the case of liquid compositions and bags, spikes or other implants, or boxes in the case of dried compositions).

In some embodiments, compositions of the invention are provided with instructions for storage out of direct sunlight and/or are maintained out of direct sunlight or other lighting that may detectably impact the stability, performance, and/or other physiochemical characteristics of one or more of the active ingredients in the composition (such compositions may be stored in containers that are non-transparent, for example). In some embodiments, compositions of the invention also or alternatively can be refrigerated or provided with instructions to store and/or ship as refrigerated compositions. In some embodiments, the composition may be stored at, for example, 1-10° C. In some embodiments, the composition may be stored at 1-5° C. In still other embodiments, the composition may be stored at 3-5° C. In some embodiments, the composition may be stored at 5-8° C. In some embodiments, the composition may be stored at 8-10° C. However, in other aspects the composition also or alternatively, typically alternatively, is stored at and/or can be stored at higher temperatures, including typical environmental (ambient) temperatures, such as 2-45° C., 4-40° C., 5-35° C., 10-35° C., 10-30° C., or 10-35° C. In this respect, it should be noted that sustained temperatures of 35° C. are considered temperate stress conditions in the context of some methods and compositions of the invention (in more particular aspects, temperature stress is defined as sustained conditions, such as 3 or more, 5 or more, 7 or more, 10 or more, 14 or more, 21 or more, or 28 or more, days of 38° C. or higher, 40° C. or higher, 45° C. or higher, or 50° C., in some cases such days occurring consecutively and in other cases occurring within a single growing season for the plant(s) in question). Compositions comprising *Kappaphycus* active ingredients according to the invention typically can be stored for 1-36 months, such as 3-24 months, e.g., 6-24 months, 6-18 months, 4-24 months, 4-18 months, 9-18 months, 12-24 months, or 12-18 months, especially those compositions that have been stabilized by application of one or more stabilizing means.

In some embodiments, administration of a *Kappaphycus* active ingredient composition of the invention, such as a stabilized liquid composition as described above, to a seed, seedling, or mature plant may be in an amount (through one or several applications) effective to produce a modified (modulated or changed) characteristic in the seed, seedling, or plant, compared to a substantially identical untreated seed, seedling, or plant, or, more typically, in a population of treated seeds, seedlings, or plants as compared to a substantially identical population of untreated seeds, seedlings, or mature plants (typically such impacts will be determined based on an average effect or at least a statistically significant showing of an effect upon administration at a 0.05, 0.1 or other suitable p-value). Such modified characteristics may comprise accelerated seed germination, accelerated seedling emergence, improved seedling emergence, improved leaf formation, accelerated leaf formation, improved plant maturation, accelerated plant maturation, increased plant yield, increased plant growth, increased plant quality, increased plant health, increased fruit yield, increased fruit growth, and increased fruit quality. Non-limiting examples of such modified characteristics may comprise accelerated achievement of the hypocotyl stage, accelerated protrusion of a stem from the soil, accelerated achievement of the cotyledon stage, accelerated leaf formation, increased marketable plant weight, increased marketable plant yield, increased marketable fruit weight, increased production plant weight, increased production fruit weight, increased utilization (indicator of efficiency in the agricultural process based on ratio of marketable fruit to unmarketable fruit), increased chlorophyll content (indicator of plant health), increased plant weight (indicator of plant health), increased root weight (indicator of plant health), increased shoot weight (indicator of plant health), increased plant height, increased thatch height, increased resistance to salt stress, increased plant resistance to heat stress (temperature stress), increased plant resistance to heavy metal stress, increased plant resistance to drought, increased plant resistance to disease, improved color, reduced insect damage, reduced blossom end rot, and reduced sun burn. Such modified characteristics may occur individually in a plant, or in combinations of multiple enhanced or otherwise modified characteristics.

In other embodiments, the modified characteristic is one in which the characteristic in the plant is reduced. Thus, for example, in certain embodiments the invention provides a method for reducing the growth rate of plants through the administration of a composition of the invention. In some cases, a composition of the invention may be growth-promoting or health-promoting at a certain amount or concentration (or range thereof) and growth-inhibiting or health-inhibiting at another set or range of amounts and/or concentrations.

In some embodiments, the *Kappaphycus* extracts or other *Kappaphycus* materials of the inventive composition, which may optionally be combined with microalgae biomass, may be dried or dehydrated to form a dried composition, such as a dried composition of *Kappaphycus* extracts and dried microalgae biomass. The microalgae biomass may be dried (reduced in moisture content) by any suitable means, typically by at least one method selected from the group consisting of: freeze drying (or lyophilization), drum (or rotary) drying, spray drying, crossflow air drying, solar drying, vacuum shelf drying, pulse combustion drying, flash drying, furnace drying, belt conveyor drying, and refractance window drying. In some embodiments, the microalgae cells or other microalgae material to be included in the dried composition with the *Kappaphycus* material(s) may be dried by a combination of two or more methods, such as in a process with multiple drying methods in series. The process of drying the biomass may reduce the percent moisture (on a wet basis) to the range of about 1-15% and result in a cake, flakes, or a powder, which is more uniform and more stable than the wet culture of *Kappaphycus*. In some embodiments, the dried microalgae may be intact. In some embodiments, the dried microalgae may be lysed or disrupted. In some embodiments, the microalgae may be lysed or disrupted prior to or after drying by mechanical, electrical, acoustic, or chemical means. In some embodiments, drying the microalgae achieves an acceptable product stability for storage, with the reduction or elimination of chemical stabilizers. The composition may be stored in any suitable container such as, but not limited to, a bag, bucket, jug, tote, or bottle.

In some embodiments, dried *Kappaphycus* or *Kappaphycus*/microalgae biomass combination may have a moisture content of 1-15% on a wet basis. In some embodiments, the dried *Kappaphycus* or *Kappaphycus*/microalgae biomass may have a moisture content of 1-2% on a wet basis. In some embodiments, the dried *Kappaphycus* or *Kappaphycus*/microalgae biomass of the composition has a moisture content of 2-3% on a wet basis. In some embodiments, the dried *Kappaphycus* or *Kappaphycus*/microalgae biomass may have a moisture content of 3-5% on a wet basis. In some embodiments, the dried *Kappaphycus* or *Kappaphycus*/microalgae biomass may have a moisture content of 5-7% on a wet basis. In some embodiments, the dried *Kappaphycus* or *Kappaphycus*/microalgae biomass may have a moisture content of 7-10% on a wet basis. In some embodiments, the dried *Kappaphycus* or *Kappaphycus*/microalgae biomass may have a moisture content of 10-12% on a wet basis. In some embodiments, the dried *Kappaphycus* or *Kappaphycus*/microalgae biomass may have a moisture content of 12-15% on a wet basis. In some embodiments, the dried *Kappaphycus* or *Kappaphycus*/microalgae biomass may have a moisture content of 1-8% on a wet basis. In some embodiments, the dried *Kappaphycus* or *Kappaphycus*/microalgae biomass may have a moisture content of 8-15% on a wet basis.

The various drying processes that can be employed in drying the *Kappaphycus* active ingredient and/or other components, such as the microalgae component of a *Kappaphycus*/microalgae combined composition have different capabilities such as, but not limited to, the amount of moisture that may be removed, the preservation of metabolites (e.g., proteins, lipids, pigments, carbohydrates, polysaccharides, soluble nitrogen, phytohormones), and the effect on the cell wall or membrane. For example, loss of protein in *Spirulina* biomass has been found to increase proportionally as the drying temperature increases. Additionally, drying at high temperatures has been shown to alter polymer chains, alter interactions between polysaccharide and glycoprotein, and increase bound water content of polysaccharides. Pigments and fatty acids are also known to oxidize and de-stabilize to different degrees in different drying processes. The effectiveness of each drying method may also vary based on the microalgae species due to different physical characteristics of the microalgae (e.g., sheer sensitivity, cell size, cell wall thickness and composition). The method of drying and drying method parameters may also result in a structural change to the microalgae cell such as, but not limited to, increased porosity in the cell wall, changes in the cell wall make up or bonds, and measurable changes in cell characteristics (e.g., elasticity, viscosity, digestibility); as wells as functional differences when applied to plants that can be measured in changes in plant performance or plant characteristics. Drying microalgae with a combination of methods in series may also result in structural and functional changes, minimize structural and functional changes, or increase the effectiveness for a particular type of microalgae.

Drum drying comprises the use of sloped, rotating cylinders which use gravity to move the microalgal biomass from one end to the other. Drum drying may be conducted with direct contact between a hot gas and the microalgal biomass, or indirect heating in which the gas and microalgal biomass is separated by a barrier such as a steel shell. A non-limiting example of a drum drying process for *Scenedesmus* may comprise 10 seconds of heating at 120° C. Possible effects to the microalga biomass in a drum drying process include sterilization of the biomass, and breaking of the cell wall. Microalgal biomass that is drum dried may have higher digestibility than microalgal biomass that is spray dried.

Freeze drying comprises freezing the microalgal biomass and then transferring the frozen biomass to a vacuum chamber with reduced pressure (e.g., 4.6 Torr). The ice in the microalgal biomass changes to vapor through sublimation which is collected on an extremely cold condenser and removed from the vacuum chamber. Freeze drying typically minimizes the degradation of unsaturated fatty acids and pigments (e.g., carotenoids) through oxidation, which preserves the nutritional value of the microalgal biomass. Although the targeted removal of water in the freeze drying process is beneficial, the process is very costly and time consuming which makes freeze drying impractical for many commercial applications. In some embodiments, microalgae dried by freeze drying may comprise 2-6% moisture (on a wet basis). A non-limiting example of a freeze drying process for *Scenedesmus* may comprise 24 hours at −84° C. Freeze drying is known to maintain the integrity of the microalgal cell, but is also known been known in some cases to disrupt the cell or increase the pore size in the cell wall. In *Scenedesmus*, freeze drying was found to decrease rigidity, increase surface area by 165%, and increase pore size by 19% of the cells (see eSEM images below). In *Phaeodactylum ricornutum*, freeze drying had no effect on the total lipid content, made the cells more susceptible to lipolysis (i.e., breakdown of lipids, hydrolysis of triglycerides into glycerol and free fatty acids) upon storage than spray dried cells, and made the cells less susceptible to oxidation than spray dried cells.

Spray drying comprises atomizing an aqueous microalgae culture into droplets sprayed downwardly in a vertical tower through which hot gases pass downward. The gas stream may be exhausted through a cyclonic separator. The process of spray drying is expensive, but slightly cheaper than freeze drying. Spray drying has become the method of choice for high value products (>$1,000/ton). With the proper type of burner, oxygen can be virtually eliminated from the recycled drying gas, which prevents the oxidation of oxygen sensitive products (e.g., carotenoids). In some embodiments, microalgae dried by spray drying may comprise 1-7% moisture (on a wet basis). Examples of spray drying systems include: box dryers, tall-form spray dryers, fluidized bed dryers, and moving fluidized bed dryers (e.g., FilterMat spray dryer GEA Process Engineering Inc.). An open cycle spray dryer with a particular direct fired air heater may operate at elevated temperatures (e.g., 60-93° C.) and high oxygen concentrations (e.g., 19-20%). The possible effects of spray drying on microalgal biomass include rupturing the cells walls, reduction of protein content by 10-15%, significant deterioration of pigments (depending on the oxygen concentration), and a lower digestibility than drum drying. In *Phaeodactylum ricornutum*, spray drying had no effect on the total lipid content, made the cells less susceptible to lipolysis than freeze drying, and made the cells more susceptible to oxidation than freeze drying (possibly due to the breakdown of protective carotenoids).

Crossflow air drying uses movement of heated air across a layer of microalgae on a tray, which is a modification of indirect solar and convection oven driers. Crossflow air drying is faster than solar drying, cheaper than drum drying, and is known to typically not break the microalgal cell wall. In some embodiments, microalgae dried by crossflow air drying may comprise 8-12% moisture (on a wet basis). Non-limiting examples of crossflow air drying for *Spirulina* may comprise: 1) a temperature of 62° C. for 14 hours, 2) a temperature of 50-60° C., a relative humidity of 7-10%, an air velocity of 1.5 m/s, and a duration of 150-220 minutes, 3) a temperature of 40-60° C. and an air velocity of 1.9-3.8 m/s, and 4) temperatures of 50-70° C. for layers of 3-7 mm in a perforated tray with parallel air flow. Crossflow air drying of *Spirulina* has shown a loss in protein of about 17% and a loss in phycocyanin of 37-50%. Particularly, degradation of phycocyanin was found to occur above 60° C., but there was no significant change in the fatty acid composition in the crossflow air drying methods.

Non-limiting examples of crossflow air drying of, e.g., *Chlorella* kessleri and *Chlamydomonas reinhardtii* comprise drying under temperature of 55° C. for more than 5 hours. Such methods can be applied to other microalgae materials and similar methods can be applied to macroalgae materials through knowledge in the art. Crossflow air drying of *Chlorella* kessleri and *Chlamydomonas reinhardtii* has produced a reduction of chlorophyll relative to the dry cell weight, an increase of total fatty acid content relative to the dry cell, a decrease of polar lipids relative to the dry cell weight, and a decrease in the availability of nutritional salts (e.g., S, N). A cell's sensitivity to air drying stress (as measured through the change in chlorophyll) may be correlated to the properties of the cell wall. For example, the crossflow air dried *Chlamydomonas reinhardtii* (hydroxyproline-rich glucoprotein based cell walls) had a larger decrease in chlorophyll than the *Chlorella* kessleri (sugar based cell walls), which may be associated with the cell wall's ability to restructure in S and N deficient conditions. In a non-limiting example of drying 5-7 mm thick layers of *Aphanothece microscopia* Nageli at temperatures of 40-60° C. with parallel air flow of 1.5 m/s, it was found that drying conditions influenced the concentrations of protein, carbohydrates, and lipids in the biomass.

Solar drying methods may comprise the use of direct solar radiation to dry microalgae on sand or a plastic sheet, or the indirect use of solar radiation to heat air that is circulated around microalgae in a dryer. Direct solar drying is strongly weather dependent, slow, and may require a short duration of high heat (e.g., 120° C.) to increase the biological value of the microalgal biomass. A non-limiting example of a direct solar drying process for *Scenedesmus* may comprise a 1,500 micron thickness white plastic drying bed liner, a temperature of 25-30° C., and a duration of 72 hours. The possible effects of direct solar drying on microalgal biomass include chlorophyll degradation, overheating of the biomass, and creation of an unpleasant odor. Indirect solar drying prevents overheating, has a higher drying rate than direct solar drying, but produces a less attractive profile in the final product. An indirect solar drying method for microalgae may comprise temperature of 65-70° C. for 0.5-6 hours.

Drying of a thin film of microalgal biomass in a convection oven is a fairly common practice performed in scientific literature to test the biomass going through further processing, but may be less practical for many commercial applications. Thin film convection oven drying has been demonstrated in the literature with species of *Chlorella*, *Chlamydomonas*, and *Scenedesmus*. In some embodiments, microalgae dried by oven drying may comprise 6-10% moisture (on a wet basis). Thin film convection oven drying methods may comprise temperatures of 30-90° C., and durations of 4-12 hours. Thin film convection oven dried microalgal biomass showed no significant change in the fatty acid profile and a slight decrease in the degree of unsaturation of fatty acids at higher temperature for ruptured cells (likely due to oxidation causing cleavage of unsaturated bonds).

Microalgae may be dried in thin layers with heat at a reduced pressure. Non-limiting examples of drying of *Spirulina* in layers within a vacuum may comprise temperatures of 50-65° C. and a pressure of 0.05-0.06 atm. Possible effects on the microalgae that may result from vacuum shelf drying include development of a hygroscopic property (i.e., ability to attract and hold water particles from the surrounding environment by absorption or adsorption) and development of a porous structure.

Pulse combustion drying uses a blast of controlled heat to flash dry the microalgae. Air is pumped into a combustion chamber, mixed with a fuel and ignited to created pressurized hot gas (e.g., at 3 psi). The dryer may automatically blast the heated gas with quench air to control the temperature of the heated gas before coming into contact with the microalgae. The process is then repeated multiple times to provide the pulses of heated gas. Pulse combustion heating is known to dry microalgae at a low heat which preserves the integrity and nutritional value of the microalgae. Flash drying comprises spraying or injecting a mixture of dried and undried material into a hot gas stream, and is commonly used in wastewater sludge drying.

Drying of microalgae using an incinerator or furnace may comprise heating the biomass to a high temperature (e.g., 100° C.) to evaporate the water. The heating may be performed at a level below the temperature at which the microalgae will burn and may comprise using hot gases that proceed downwardly with the biomass in parallel flow. Microalgae that are dewatered to an appropriate solids level may be dried indirectly by heating elements lining the pathway of a belt conveyor. Refractance window drying is a dehydration method that uses infra-red light, rather than high direct temperature, to remove moisture from microalgae. Wet microalgae biomass may be translated through an evaporation chamber by a belt disposed above a circulating hot water reservoir to dry the microalgae with infra-red energy in a refractance window drying. In some embodiments, microalgae dried by refractance window drying may comprise 3-8% moisture (on a wet basis).

In some embodiments, the dry composition may be mixed with water and stabilized by heating and cooling in a pasteurization process, adjustment of pH, the addition of an inhibitor of yeast and mold growth, or combinations thereof. In one non-limiting example of preparing the dried microalgae composition for application to plants, the microalgae harvested from the culturing system is first held in a harvest tank before centrifuging the culture. Once the microalgae is centrifuged, the centrifuge discharges the fraction rich in microalgae whole cell solids, but also containing the accompanying constituents from the culture medium, into a container at a temperature of about 30° C. The microalgae composition is then dried.

Surprisingly, the inventors have found that administration of the described *Kappaphycus* active ingredient compositions, even in relatively low concentration applications (as compared to what has been performed/known in the art), can be effective in producing modified characteristics in plants, such as characteristics in which plant growth and/or health are detectably changed compared to a control. The result of applying such compositions and methods can occur through a number of suitable methods. In some embodiments, for example, a liquid composition may be effectively administered to a plant seed before the seed is planted. This may comprise applying a composition of the invention to a seed as a seed coat. In some embodiments, a liquid composition may be administered at the time the seed is planted. In some embodiments, a liquid composition may be administered after the seed is planted. In some embodiments, a liquid composition may be administered to plants that have emerged from the ground. In some embodiments, a dried composition may be applied to the soil before, during, or after the planting of a seed. In some embodiments, a dried composition may be applied to the soil before or after a plant emerges from the soil.

In some embodiments, the volume or mass of the *Kappaphycus* active ingredient based composition (e.g., a *Kappaphycus*/microalgae ingredients based composition) applied to a seed, seedling, or mature plant may not increase or decrease during the growth cycle of the plant (i.e., the amount of the *Kappaphycus* or *Kappaphycus*/microalgae ingredients composition applied to the plant will not change as the plant grows larger). In some embodiments, the volume or mass of the microalgae based composition applied to a seed, seedling, or plant may increase during the growth cycle of the plant (i.e., applied on a mass or volume per plant mass basis to provide more of the microalgae composition as the plant grows larger). In some embodiments, the volume or mass of the *Kappaphycus* ingredient based composition applied to a seed, seedling, or plant may decrease during the growth cycle of the plant (i.e., applied on a mass or volume per plant mass basis to provide more of the microalgae composition as the plant grows larger).

Seed Soak Application

In one non-limiting embodiment, the administration of a liquid composition according to certain aspects of the invention may comprise soaking the seed in an effective amount of the liquid composition before planting the seed. In some embodiments, the administration of such a liquid composition further comprises removing the seed from the liquid composition after soaking, and drying the seed before planting. In some embodiments, the seed may be soaked in the liquid composition for a time period in the range of 90-150 minutes. In some embodiments, the seed may be soaked in the liquid composition for a time period in the range of 110-130 minutes. In some embodiments, the seed may be soaked in the liquid composition for a time period in the range of 90-100 minutes. In some embodiments, the seed may be soaked in the liquid composition for a time period in the range of 100-110 minutes. In some embodiments, the seed may be soaked in the liquid composition for a time period in the range of 110-120 minutes. In some embodiments, the seed may be soaked in the liquid composition for a time period in the range of 120-130 minutes. In some embodiments, the seed may be soaked in the liquid composition for a time period in the range of 130-140 minutes. In some embodiments, the seed may be soaked in the liquid composition for a time period in the range of 140-150 minutes.

A liquid composition of the invention may be diluted to a lower concentration for an effective amount in a seed soak application by mixing a volume of the composition in a volume of water. The concentration of macroalgae sourced components resulting in the diluted composition may be calculated by the multiplying the original concentration in the composition by the ratio of the volume of the composition to the volume of water. Alternatively, the grams of macroalgae sourced components in the diluted composition can be calculated by the multiplying the original grams of macroalgae sourced components per 100 mL by the ratio of the volume of the composition to the volume of water.

Soil Application—Seed

In another non-limiting embodiment, the administration of the composition may comprise contacting the soil in the immediate vicinity of the planted seed with an effective amount of the composition. In some embodiments, the liquid composition may be supplied to the soil by injection into a low volume irrigation system, such as but not limited to a drip irrigation system supplying water beneath the soil through perforated conduits or at the soil level by fluid conduits hanging above the ground or protruding from the ground. In some embodiments, the liquid composition may be supplied to the soil by a soil drench method wherein the liquid composition is poured on the soil.

The composition may be diluted to a lower concentration for an effective amount in a soil application by mixing a volume of the composition in a volume of water. The concentration of macroalgae sourced components resulting in the diluted composition may be calculated by the multiplying the original concentration in the composition by the ratio of the volume of the composition to the volume of water. Alternatively, the grams of macroalgae sourced components in the diluted composition can be calculated by the multiplying the original grams of macroalgae sourced components per 100 mL by the ratio of the volume of the composition to the volume of water.

The rate of application of a composition at the desired concentration may be expressed as a volume per area. In some embodiments, the rate of application of the liquid composition in a soil application may comprise a rate in the range of 50-150 gallons/acre, more typically 0.25-25 gal/acre, such as 0.5-5 gal/acre, 0.5-2.5 gal/acre, 0.25-5 gal/acre, 0.25-2.5 gal/acre, 0.5-1.5 gal/acre, or 0.75-1.5 gal/acre. In some embodiments, the rate of application of the liquid composition in a soil application may comprise a rate in the range of 0.125-125 gallons/acre. In some embodiments, the rate of application of the liquid composition in a soil application may comprise a rate in the range of 0.5-75 gallons/acre. In some embodiments, the rate of application of the liquid composition in a soil application may comprise a rate in the range of 0.75-100 gallons/acre. In some embodiments, the rate of application of the liquid composition in a soil application may comprise a rate in the range of 1-125 gallons/acre, such as 5-100, 10-100, 5-50, 10-50, 5-25, or 10-25 gal/acre. In some embodiments, the rate of application of the liquid composition in a soil application may comprise a rate in the range of 10-150 gallons/acre, such as 50-150 gal/acre or 100-150 gal/acre.

In some embodiments, the rate of application of the liquid composition in a soil application may comprise a rate in the range of 10-50 gallons/acre. In some embodiments, the rate of application of the liquid composition in a soil application may comprise a rate in the range of 1-20 gallons/acre. In some embodiments, the rate of application of the liquid composition in a soil application may comprise a rate in the range of 0.5-35 gal/acre, such as 1-30 gallons/acre or 2-30 gallons/acre. In some embodiments, the rate of application of the liquid composition in a soil application may comprise a rate in the range of 1-40 gallons/acre. In some embodiments, the rate of application of the liquid composition in a soil application may comprise a rate in the range of 40-50 gallons/acre.

In other embodiments, the rate of application of a liquid composition of the invention in a soil application may comprise a rate in the range of 0.01-10 gallons/acre. In some embodiments, the rate of application of the liquid composition in a soil application may comprise a rate in the range of 0.01-0.1 gallons/acre, such as 0.05-0.1 gal/acre or 0.075-0.1 gal/acre. In some embodiments, the rate of application of the liquid composition in a soil application may comprise a rate in the range of 0.1-2.5 gallons/acre, such as 0.25-2.5 gal/acre, 0.5-5 gal/acre, 0.5-2.5 gal/acre, 0.5-2 gal/acre, or 0.5-1.5 gal/acre. In some embodiments, the rate of application of the liquid composition in a soil application may comprise a rate in the range of 1-2 gallons/acre. In some embodiments, the rate of application of the liquid composition in a soil application may comprise a rate in the range of 2-3 gallons/acre. In some embodiments, the rate of application of the liquid composition in a soil application may comprise a rate in the range of 3-4 gallons/acre. In some embodiments, the rate of application of the liquid composition in a soil application may comprise a rate in the range of 4-5 gallons/acre. In some embodiments, the rate of application of the liquid composition in a soil application may comprise a rate in the range of 5-10 gallons/acre.

In some embodiments, the rate of application of the liquid composition in a soil application may comprise a rate in the range of 2-20 liters/acre. In some embodiments, the rate of application of the liquid composition in a soil application may comprise a rate in the range of 3.7-15 liters/acre. In some embodiments, the rate of application of the liquid composition in a soil application may comprise a rate in the range of 2-5 liters/acre. In some embodiments, the rate of application of the liquid composition in a soil application may comprise a rate in the range of 5-10 liters/acre. In some embodiments, the rate of application of the liquid composition in a soil application may comprise a rate in the range of 10-15 liters/acre. In some embodiments, the rate of application of the liquid composition in a soil application may comprise a rate in the range of 15-20 liters/acre.

Capillary Action Application

In another non-limiting embodiment, the administration of the liquid composition may comprise first soaking the seed in water, removing the seed from the water, drying the seed, applying an effective amount of the liquid composition below the seed planting level in the soil, and planting the seed, wherein the liquid composition supplied to the seed from below by capillary action. In some embodiments, the seed may be soaked in water for a time period in the range of 90-150 minutes. In some embodiments, the seed may be soaked in water for a time period in the range of 110-130 minutes. In some embodiments, the seed may be soaked in water for a time period in the range of 90-100 minutes. In some embodiments, the seed may be soaked in water for a time period in the range of 100-110 minutes. In some embodiments, the seed may be soaked in water for a time period in the range of 110-120 minutes. In some embodiments, the seed may be soaked in water for a time period in the range of 120-130 minutes. In some embodiments, the seed may be soaked in water for a time period in the range of 130-140 minutes. In some embodiments, the seed may be soaked in water for a time period in the range of 140-150 minutes.

The composition may be diluted to a lower concentration for an effective amount in a capillary action application by mixing a volume of the composition in a volume of water. The concentration of macroalgae sourced components resulting in the diluted composition may be calculated by the multiplying the original concentration in the composition by the ratio of the volume of the composition to the volume of water. Alternatively, the grams of macroalgae sourced components in the diluted composition can be calculated by the multiplying the original grams of macroalgae sourced components per 100 mL by the ratio of the volume of the composition to the volume of water.

Hydroponic Application

In another non-limiting embodiment, the administration of the liquid composition to a seed or plant may comprise applying the macroalgae based composition in combination with a nutrient medium to seeds disposed in and plants growing in a hydroponic growth medium or an inert growth medium (e.g., coconut husks). The liquid composition may be applied multiple times per day, per week, or per growing season.

Foliar Application

In one non-limiting embodiment, the administration of the composition may comprise contacting the foliage of the plant with an effective amount of the composition. In some embodiments, the liquid composition may be sprayed on the foliage by a hand sprayer, a sprayer on an agriculture implement, or a sprinkler.

The composition may be diluted to a lower concentration for an effective amount in a foliar application by mixing a volume of the composition in a volume of water. The concentration of macroalgae sourced components resulting in the diluted composition may be calculated by the multiplying the original concentration in the composition by the ratio of the volume of the composition to the volume of water. Alternatively, the grams of macroalgae sourced components in the diluted composition can be calculated by the multiplying the original grams of macroalgae sourced components per 100 mL by the ratio of the volume of the composition to the volume of water.

The rate of application of the composition at the desired concentration may be expressed as a volume per area. In some embodiments, the rate of application of the liquid composition in a foliar application may comprise a rate in the range of 10-50 gallons/acre. In some embodiments, the rate of application of the liquid composition in a foliar application may comprise a rate in the range of 10-15 gallons/acre. In some embodiments, the rate of application of the liquid composition in a foliar application may comprise a rate in the range of 15-20 gallons/acre. In some embodiments, the rate of application of the liquid composition in a foliar application may comprise a rate in the range of 20-25 gallons/acre. In some embodiments, the rate of application of the liquid composition in a foliar application may comprise a rate in the range of 25-30 gallons/acre. In some embodiments, the rate of application of the liquid composition in a foliar application may comprise a rate in the range of 30-35 gallons/acre. In some embodiments, the rate of application of the liquid composition in a foliar application may comprise a rate in the range of 35-40 gallons/acre. In some embodiments, the rate of application of the liquid composition in a foliar application may comprise a rate in the range of 40-45 gallons/acre. In some embodiments, the rate of application of the liquid composition in a foliar application may comprise a rate in the range of 45-50 gallons/acre.

In some embodiments, the rate of application of the liquid composition in a foliar application may comprise a rate in the range of 0.01-10 gallons/acre, such as 0.025-7.5 gal/acre, 0.025-5 gal/acre, 0.05-5 gal/acre, 0.05-2.5 gal/acre, 0.1-5 gal/acre, 0.1-2.5 gal/acre, 0.25-5 gal/acre, or 0.25-2.5 gal/acre, e.g., 0.5-2 gal/acre. In some embodiments, the rate of application of the liquid composition in a foliar application may comprise a rate in the range of 0.01-0.1 gallons/acre. In some embodiments, the rate of application of the liquid composition in a foliar application may comprise a rate in the range of 0.1-1.0 gallons/acre. In some embodiments, the rate of application of the liquid composition in a foliar application may comprise a rate in the range of 1-2 gallons/acre. In some embodiments, the rate of application of the liquid composition in a foliar application may comprise a rate in the range of 2-3 gallons/acre. In some embodiments, the rate of application of the liquid composition in a foliar application may comprise a rate in the range of 3-4 gallons/acre. In some embodiments, the rate of application of the liquid composition in a foliar application may comprise a rate in the range of 4-5 gallons/acre. In some embodiments, the rate of application of the liquid composition in a foliar application may comprise a rate in the range of 5-10 gallons/acre.

The frequency of the application of the composition, in those embodiments wherein the composition of the invention is applied more than once to a plant (or more than once during a season in the case of, e.g., a perennial plant), can be expressed as the number of applications per period of time (e.g., two applications per month), or by the period of time between applications (e.g., one application every 21 days). In some embodiments, the plant may be directly or indirectly contacted (e.g., the soil associated with the plant may be treated) by the composition in an application every 3-30 days for a period of 6, 8, 10, 12, 14, 16, 18, 20, 24 or more weeks. In some embodiments, the plant may be contacted by the composition in a foliar application every 2-21 days, such as every 4-14 days, for example every 3, 5, 7, 10, or 14 days, for a period of 1, 2, 3, 4, 5, or 6 months, or longer (e.g., in the case of perennial plants treated with the composition throughout the year). In some embodiments, the plant may be contacted by the composition in a foliar application every 18-24 days. In some embodiments, the plant may be contacted by the composition in a foliar application every 3-7 days. In some embodiments, the plant may be contacted by the composition in a foliar application every 7-14 days. In some embodiments, the plant may be contacted by the composition in a foliar application every 14-21 days. In some embodiments, the plant may be contacted by the composition in a foliar application every 21-28 days.

Foliar application(s) of compositions of the invention generally begin after the plant has become established, but may begin before establishment, at defined time period after planting, or at a defined time period after emergence form the soil in some embodiments. In some embodiments, the plant may be first contacted by the composition in a foliar application 5-14 days after the plant emerges from the soil. In some embodiments, the plant may be first contacted by the composition in a foliar application 5-7 days after the plant emerges from the soil. In some embodiments, the plant may be first contacted by the composition in a foliar application 7-10 days after the plant emerges from the soil. In some embodiments, the plant may be first contacted by the composition in a foliar application 10-12 days after the plant emerges from the soil. In some embodiments, the plant may be first contacted by the composition in a foliar application 12-14 days after the plant emerges from the soil.

Soil Application—Plant

In another non-limiting embodiment, the administration of the composition may comprise contacting the soil in the immediate vicinity of the plant with an effective amount of the composition. In some embodiments, the liquid composition may be supplied to the soil by injection into to a low volume irrigation system, such as but not limited to a drip irrigation system supplying water beneath the soil through perforated conduits or at the soil level by fluid conduits hanging above the ground or protruding from the ground. In some embodiments, the liquid composition may be supplied to the soil by a soil drench method wherein the liquid composition is poured on the soil.

The composition may be diluted to a lower concentration for an effective amount in a soil application by mixing a volume of the composition in a volume of water. The concentration of macroalgae sourced components resulting in the diluted composition may be calculated by the multiplying the original concentration of macroalgae sourced components in the composition by the ratio of the volume of the composition to the volume of water. Alternatively, the grams of macroalgae cells in the diluted composition can be calculated by the multiplying the original grams of macroalgae sourced components per 100 mL by the ratio of the volume of the composition to the volume of water.

The rate of application of the composition at the desired concentration may be expressed as a volume per area. In some embodiments, the rate of application of the liquid composition in a soil application may comprise a rate in the range of 0.1-150 gallons/acre, such as 0.25-150 gallons/acre (e.g., 0.25-25 gal/acre, 0.25-50 gal/acre, 0.5-25 gal/acre, 0.5-20 gal/acre, 0.5-5 gal/acre, 0.5-2.5 gal/acre, or 0.25-2.5 gal/acre). In some embodiments, the rate of application of the liquid composition in a soil application may comprise a rate in the range of 1-125 gallons/acre, such as 2-120 gal/acre, e.g., 5-100 gal/acre. In some embodiments, the rate of application of the liquid composition in a soil application may comprise a rate in the range of 10-100, such as 20-100, 25-100, 25-75, or 25-50 gallons/acre. In some embodiments, the rate of application of the liquid composition in a soil application may comprise a rate in the range of 0.5-20, such as 1-15 gallons/acre.

In some embodiments, the rate of application of the liquid composition in a soil application may comprise a rate in the range of 25-125 gallons/acre, such as 50-125 gal/acre, 75-125 gal/acre, or 10-100 gal/acre. In still other embodiments, the rate of application of the liquid composition in a soil application may comprise a rate in the range of 25-150 gallons/acre, such as 50-100 gal/acre.

In some embodiments, the rate of application of the liquid composition in a soil application may comprise a rate in the range of 10-50 gallons/acre. In some embodiments, the rate of application of the liquid composition in a soil application may comprise a rate in the range of 10-20 gallons/acre. In some embodiments, the rate of application of the liquid composition in a soil application may comprise a rate in the range of 20-30 gallons/acre. In some embodiments, the rate of application of the liquid composition in a soil application may comprise a rate in the range of 30-40 gallons/acre. In some embodiments, the rate of application of the liquid composition in a soil application may comprise a rate in the range of 40-50 gallons/acre.

In some embodiments, the rate of application of the liquid composition in a soil application may comprise a rate in the range of 0.01-10 gallons/acre. In some embodiments, the rate of application of the liquid composition in a soil application may comprise a rate in the range of 0.01-0.1 gallons/acre. In some embodiments, the rate of application of the liquid composition in a soil application may comprise a rate in the range of 0.1-1.0 gallons/acre. In some embodiments, the rate of application of the liquid composition in a soil application may comprise a rate in the range of 1-2 gallons/acre. In some embodiments, the rate of application of the liquid composition in a soil application may comprise a rate in the range of 2-3 gallons/acre. In some embodiments, the rate of application of the liquid composition in a soil application may comprise a rate in the range of 3-4 gallons/acre. In some embodiments, the rate of application of the liquid composition in a soil application may comprise a rate in the range of 4-5 gallons/acre. In some embodiments, the rate of application of the liquid composition in a soil application may comprise a rate in the range of 5-10 gallons/acre.

In some embodiments, the rate of application of the liquid composition in a soil application may comprise a rate in the range of 2-20 liters/acre. In some embodiments, the rate of application of the liquid composition in a soil application may comprise a rate in the range of 3.7-15 liters/acre. In some embodiments, the rate of application of the liquid composition in a soil application may comprise a rate in the range of 2-5 liters/acre. In some embodiments, the rate of application of the liquid composition in a soil application may comprise a rate in the range of 5-10 liters/acre. In some embodiments, the rate of application of the liquid composition in a soil application may comprise a rate in the range of 10-15 liters/acre. In some embodiments, the rate of application of the liquid composition in a soil application may comprise a rate in the range of 15-20 liters/acre.

The frequency of the application of a composition may be expressed as the number of applications per period of time (e.g., two applications per month), or by the period of time between applications (e.g., one application every 7, 14, 21, or 28 days), for those embodiments in which a composition is applied multiple times to a plant (or multiple times in a period, such as a growing season). In some embodiments, the plant may be contacted by the composition in a soil application every 1-14, such as every 4-10 days or every 2-14 days. In some embodiments, the plant may be contacted by the liquid composition in a soil application every 14-28, such as every 14-21 days. In some embodiments, the plant may be contacted by the composition in a soil application every 3-7 days. In some embodiments, the plant may be contacted by the composition in a soil application every 7-14 days. In some embodiments, the plant may be contacted by the composition in a soil application every 14-21 days. In some embodiments, the plant may be contacted by the composition in a soil application every 21-28 days. The composition may be administered one or several times. In some aspects, the composition is administered according to a suitable schedule (frequency) such as those described here, for a period of 1, 2, 3, 4, 5, or 6 months, or even longer (e.g., in the case of perennial plants).

Soil application(s) of compositions of the invention generally begin after the plant has become established, but may begin before establishment, at defined time period after planting, or at a defined time period after emergence form the soil in some embodiments. In some embodiments, the plant may be first contacted by the composition in a soil application 1-21 days, such as every 2-14 days after the plant emerges from the soil. In some embodiments, the plant may be first contacted by the composition in a soil application 1-7 days, such as every 3-7 days or every 5-7 days after the plant emerges from the soil. In some embodiments, the plant may be first contacted by the liquid composition in a soil application 7-10 days after the plant emerges from the soil. In some embodiments, the plant may be first contacted by the composition in a soil application 10-12 days after the plant emerges from the soil. In some embodiments, the plant may be first contacted by the composition in a soil application 12-14 days after the plant emerges from the soil.

Whether in a seed soak, soil, capillary action, foliar, or hydroponic application the method of use comprises relatively low concentrations of the composition. Even at such low concentrations, the described composition has been shown to be effective at producing an enhanced characteristic in plants. The ability to use low concentrations allows for a reduced impact on the environment that may result from over application and an increased efficiency in the method of use of the composition by requiring a small amount of material to produce the desired effect. In some embodiments, the use of the liquid composition with a low volume irrigation system in soil applications allows the low concentration of the liquid composition to remain effective and not be diluted to a point where the composition is no longer in at a concentration capable of producing the desired effect on the plants while also increasing the grower's water use efficiency.

In conjunction with the low concentrations of macroalgae extracts in the composition necessary to be effective for enhancing the described characteristics of plants, the composition may does not have be to administered continuously or at a high frequency (e.g., multiple times per day, daily). The ability of the composition to be effective at low concentrations and a low frequency of application was an unexpected result, due to the traditional thinking that as the concentration of active ingredients decreases the frequency of application should increase to provide adequate amounts of the active ingredients. Effectiveness at low concentration and application frequency increases the material usage efficiency of the method of using the composition while also increasing the yield efficiency of the agricultural process.

Administration of a dry composition treatment to the soil, seed, or plant can be in an amount effective to produce an enhanced characteristic in the plant compared to a substantially identical population of untreated plant. Such enhanced characteristics can comprise accelerated seed germination, accelerated seedling emergence, improved seedling emergence, improved leaf formation, accelerated leaf formation, improved plant maturation, accelerated plant maturation, increased plant yield, increased plant growth, increased plant quality, increased plant health, increased flowering, increased fruit yield, increased fruit growth, and increased fruit quality. Non-limiting examples of such enhanced characteristics can comprise accelerated achievement of the hypocotyl stage, accelerated protrusion of a stem from the soil, accelerated achievement of the cotyledon stage, accelerated leaf formation, increased leaf size, increased leaf area index, increased marketable plant weight, increased marketable plant yield, increased marketable fruit weight, increased production plant weight, increased production fruit weight, increased utilization (indicator of efficiency in the agricultural process based on ratio of marketable fruit to unmarketable fruit), increased chlorophyll content (indicator of plant health), increased plant weight (characteristic of growth and/or indicator of health), increased root weight (characteristic of growth and/or indicator of health), increased root mass (characteristic of growth and/or indicator of health), increased shoot weight (characteristic of growth and/or indicator of health), increased plant height, increased thatch height, increased resistance to salt stress, increased plant resistance to heat stress (temperature stress), increased plant resistance to heavy metal stress, increased plant resistance to drought, increased plant resistance to disease improved color, reduced insect damage, reduced blossom end rot, and reduced sun burn. Such enhanced characteristics can occur individually in a plant, or in combinations of multiple enhanced characteristics. The characteristic of flowering has is important for not only the ornamental market, but also for fruiting plants where an increase in flowering may correlate to an increase in fruit production.

Seed Coating

In one non-limiting embodiment, the administration of the macroalgae extracts composition treatment can comprise coating a seed. In some embodiments, a seed may be coated by passing through a slurry comprising macroalgae extracts and then dried. In some embodiments, the seed may be coated with the dried macroalgae based composition and other components such as, but not limited to, binders and fillers known in the art to be suitable for coating seeds. The fillers may comprise suitable inorganic particles such as, but not limited to, silicate particles, carbonate particles, and sulphate particles, quartz, zeolites, pumice, perlite, diatomaceous earth, pyrogene silica, $Sb_2O_3$, $TiO_2$, lithopone, ZnO, and hydrated aluminum oxide. The binders may include, but are not limited to, water-soluble polymers, polyvinyl acetate, polyvinyl alcohol, polyvinyl pyrrolidone, polyurethane, methyl cellulose, carboxymethyl cellulose, hydroxylpropyl cellulose, sodium alginate, polyacrylate, casein, gelatin, pullulan, polyacrylamide, polyethylene oxide, polystyrene, styrene acrylic copolymers, styrene butadiene polymers, poly (N-vinylacetamide), waxes, canauba wax, paraffin wax, polyethylene wax, bees wax, polypropylene wax, and ethylene vinyl acetate. In some embodiments, the seed coating may comprise a wetting and dispersing additive such as, but not limited to polyacrylates, organo-modified polyacrylates, sodium polyacrylates, polyurethanes, phosphoric acid esters, star polymers, and modified polyethers.

In some embodiments, the seed coating may comprise other components such as, but not limited to, a solvent, thickener, coloring agent, anti-foaming agent, biocide, surfactant, and pigment. In some embodiments, the seed coating may comprise a hydrogel or film coating materials. In some embodiments, the concentration of dried macroalgae components in the seed coating may comprise 0.001-20% solids. In some embodiments, the concentration of dried macroalgae components in the seed coating may comprise less than 0.1% solids. In some embodiments, the concentration of dried macroalgae components in the seed coating may comprise 0.001-0.01% solids. In some embodiments, the concentration of dried macroalgae components in the seed coating may comprise 0.01-0.1% solids. In some embodiments, the concentration of dried macroalgae components in the seed coating may comprise 0.1-1% solids. In some embodiments, the concentration of dried macroalgae components in the seed coating may comprise 1-2% solids. In some embodiments, the concentration of dried macroalgae components in the seed coating may comprise 2-3% solids. In some embodiments, the concentration of dried macroalgae components in the seed coating may comprise 3-5% solids. In some embodiments, the concentration of dried macroalgae components in the seed coating may comprise 5-10% solids. In some embodiments, the concentration of dried macroalgae components in the seed coating may comprise 10-15% solids. In some embodiments, the concentration of dried macroalgae components in the seed coating may comprise 15-20% solids. In some embodiments, the seed may be coated in a single step. In some embodiments, the seed may be coated in multiple steps. Conventional or otherwise suitable coating equipment or techniques may be used to coat the seeds. Suitable equipment may include drum coaters, fluidized beds, rotary coaters, side vended pan, tumble mixers, and spouted beds. Suitable techniques may comprise mixing in a container, tumbling, spraying, or immersion. After coating, the seeds may be dried or partially dried.

Soil Application

In another non-limiting embodiment, the administration of the dried macroalgae components composition treatment can comprise mixing an effective amount of the composition with a solid growth medium, such as soil, potting mix, compost, or inert hydroponic material, prior to planting a seed, seedling, or plant in the solid growth medium. The dried macroalgae components composition may be mixed in the solid growth medium at an inclusion level of 0.001-20% by volume. In some embodiments, the effective amount in a mixed solid growth medium application of the dried macroalgae components composition can comprise a concentration in the range of 0.001-0.01% solids. In some embodiments, the effective amount in a mixed solid growth medium application of the dried macroalgae components composition can comprise a concentration in the range of 0.01-0.1% solids. In some embodiments, the effective amount in a mixed solid growth medium application of the dried macroalgae components composition can comprise a concentration in the range of 0.1-1% solids. In some embodiments, the effective amount in a mixed solid growth medium application of the dried macroalgae components composition can comprise a concentration in the range of 1-3%% solids. In some embodiments, the effective amount in a mixed solid growth medium application of the dried macroalgae components composition can comprise a concentration in the range of 3-5% solids. In some embodiments, the effective amount in a mixed solid growth medium application of the dried macroalgae components composition can comprise a concentration in the range of 5-10% solids. In some embodiments, the effective amount in a mixed solid growth medium application of the dried macroalgae components composition can comprise a concentration in the range of 10-20% solids.

In another non-limiting embodiment, the administration of a dried *Kappaphycus* active ingredient macroalgae composition treatment can comprise inclusion in a solid growth medium during in-furrow plants or broadcast application to the ground. The dried *Kappaphycus* microalgae composition may be applied at a rate of 50-500 grams/acre. In some embodiments, the application rate of the dried microalgae composition can comprise 50-100 grams/acre. In some embodiments, the application rate of the dried microalgae composition can comprise 100-150 grams/acre. In some embodiments, the application rate of the dried *Kappaphycu* microalgae composition can comprise 150-200 grams/acre. In some embodiments, the application rate of the dried microalgae composition can comprise 200-250 grams/acre. In some embodiments, the application rate of the dried microalgae composition can comprise 250-300 grams/acre. In some embodiments, the application rate of the dried microalgae composition can comprise 300-350 grams/acre. In some embodiments, the application rate of the dried microalgae composition can comprise 350-400 grams/acre. In some embodiments, the application rate of the dried microalgae composition can comprise 400-450 grams/acre. In some embodiments, the application rate of the dried *Kappaphycus* microalgae composition can comprise 450-500 grams/acre.

In other embodiments, a dried *Kappaphycus* macroalgae composition of the invention may be applied at a rate of 1-100 grams/acre, such as 2-80 grams/acre, e.g., 3-60 grams/acre, 5-50 grams/acre, or 10-50 grams/acre. In some embodiments, the application rate of the dried macroalgae composition can comprise 1-20 grams per acre, such as 2-20 grams/acre, 5-20 grams/acre, or 10-20 grams/acre. In some embodiments, the application rate of the dried *Kappaphycus* macroalgae composition can comprise 5-30 grams/acre, 10-30 grams/acre, or 20-30 grams/acre. In some embodiments, the application rate of the dried macroalgae composition can comprise 20-50 grams/acre, 25-45 grams/acre, or 30-40 grams/acre. In some embodiments, the application rate of the dried macroalgae composition can comprise 40-50 grams/acre. As with other embodiments of the invention, such amounts can be applied several times to a plant or during a period (e.g., a season), such as 2, 3, 4, 5, 6, 7, 8, 10, 12, 15, 20, 25, or 30 times (e.g., 1-40 times, 2-40 times, 2-30 times, 3-30 times, 4-30 ties, 5-30 times, 4-20 times, or 5-20 times during a period of 1, 2, 3, 4, 5, or 6 months, or longer).

A dried *Kappahycus* macroalgae active ingredient composition can alternatively be applied in certain aspects at a rate of 0.001-10 grams/acre. In some embodiments, the application rate of the dried *Kappaphycus* macroalgae active ingredient composition comprises 0.001-0.01 grams active ingredient/acre. In some embodiments, the application rate of the dried macroalgae composition and/or active ingredient can comprise 0.01-0.1 grams/acre. In some embodiments, the application rate of the dried macroalgae composition and/or active ingredient can comprise 0.1-1.0 grams/acre. In some embodiments, the application rate of the dried macroalgae composition can comprise 1-2 grams/acre. In some embodiments, the application rate of the dried macroalgae composition can comprise 2-3 grams/acre. In some embodiments, the application rate of the dried macroalgae composition can comprise 3-4 grams/acre (it will be recognized by those of skill in the art that the exemplary amounts provided with respect to such administration methods in this and other contexts of this description of the invention can refer to the amount of active ingredient or the total amount of active ingredient-containing composition). In some embodiments, the application rate of the dried *Kappaphycus* active ingredient macroalgae composition can comprise 4-5 grams/acre. In some embodiments, the application rate of the dried macroalgae composition can comprise 5-10 grams/acre.

EXAMPLES

Embodiments of the invention are exemplified and additional embodiments are disclosed in further detail in the following Examples, which are not in any way intended to limit the scope of any aspect of the invention described herein.

Example 1—Fabaceae (Leguminosae)

Experiments are conducted to test effects of application of a *Kappaphycus* based composition to crop plants of the family Fabaceae (Leguminosae). Application is done as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measures for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results show at least a 10% quantitative improvement and/or a statistically significant improvement as to at least one characteristic under at least one mode of application (a-g) of the composition.

Example 2—Poaceae

Experiments are conducted to test effects of application of a *Kappaphycus* based composition to crop plants of the family Poaceae. Application is done as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measures for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results show at least a 10% quantitative improvement and/or a statistically significant improvement as to at least one characteristic under at least one mode of application (a-g) of the composition.

Example 3—Roasaceae

Experiments are conducted to test effects of application of a *Kappaphycus* based composition to crop plants of the family Roasaceae. Application is done as in other examples herein, such that, in various treatments, (a) seeds are wetted or soaked in the composition; ((b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measures for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results show at least a 10% quantitative improvement and/or a statistically significant improvement as to at least one characteristic under at least one mode of application (a-g) of the composition.

Example 4—Vitaceae

Experiments are conducted to test effects of application of a *Kappaphycus* based composition to crop plants of the family Vitaceae. Application is done as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measures for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results show at least a 10% quantitative improvement and/or a statistically significant improvement as to at least one characteristic under at least one mode of application (a-g) of the composition.

Example 5—Brassicaeae (Cruciferae)

Experiments are conducted to test effects of application of a *Kappaphycus* based composition to crop plants of the family Brassicaeae (Cruciferae). Application is done as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (l) the composition is applied periodically to soil during the growing season; and/or (g) the composition is applied to leaves of the plants once or periodically during the growing season. Results are measures for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results show at least a 10% quantitative improvement and/or a statistically significant improvement as to at least one characteristic under at least one mode of application (a-g) of the composition.

Example 6—Caricaceae

Experiments are conducted to test effects of application of a *Kappaphycus* based composition to crop plants of the family Caricaceae. Application is done as in other examples herein, such that, in various treatments, (a) seeds are wetted or soaked in the composition; ((b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measures for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results show at least a 10% quantitative improvement and/or a statistically significant improvement as to at least one characteristic under at least one mode of application (a-g) of the composition.

Example 7—Malvaceae

Experiments are conducted to test effects of application of a *Kappaphycus* based composition to crop plants of the family Malvaceae. Application is done as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measures for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results show at least a 10% quantitative improvement and/or a statistically significant improvement as to at least one characteristic under at least one mode of application (a-g) of the composition.

Example 8—Sapindaceae

Experiments are conducted to test effects of application of a *Kappaphycus* based composition to crop plants of the family Sapindaceae. Application is done as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measures for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results show at least a 10% quantitative improvement and/or a statistically significant improvement as to at least one characteristic under at least one mode of application (a-g) of the composition.

Example 9—Anacardiaceae

Experiments are conducted to test effects of application of a *Kappaphycus* based composition to crop plants of the family Anacardiaceae. Application is done as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measures for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results show at least a 10% quantitative improvement and/or a statistically significant improvement as to at least one characteristic under at least one mode of application (a-g) of the composition.

Example 10

An experiment was performed to determine the effect of treating *Arabidopsis thaliana* with an extract of *Kappaphycus alvarezzi* under normal growth conditions and under salt stressed conditions. The *Kappaphycus alvarezzi* biomass was subjected to an ethanol extraction process. The bioassay was initiated using four day old plantlets grown on half strength Murashige and Skoog (MS) medium, supplemented with 1% (w/v) sucrose and solidified with 0.4% (w/v) Phytagel in square petri plates. Plates were vertically stacked in the growth chamber set at 22° C. with 16-h light/8-h dark cycle, with light intensity of 100 $\mu mol/m^{-2}s^{-1}$. Each plate contained five replicate plantlets. Plantlets were transferred on medium supplemented with concentrations of 0.01% (0.01 mL/L), 0.001% (0.001 mL/L), or 0.0001% (0.0001 mL/L) of an extract of *Kappaphycus alvarezzi* and compared to an untreated control. Each concentration of each treatment was tested in triplicate.

The *Kappaphycus* treatments were prepared by first weighing out 100 grams of biomass. Next the biomass was heated at 95-90° C. for 1 hour with a solution of 30 g of NaOH (KOH is also suitable) in 1,000 mL of water. After the heating step, the reaction mixture was drained and the biomass was washed three times with water until free of the alkaline solution. The alkaline solution was then neutralized by the addition of sulfuric acid to a pH in the range of 6-8 and freeze dried to obtain the hydrolysis extract fraction. The filtered biomass was then soaked in 1 liter of a 0.01% hydrochloric acid solution for 10 minutes and washed three times with water. The washed biomass was then suspended in 700 mL of water and heated to reflux for 1 hour, blended, and then the paste and washing was heated for 3 hours at 95° C. The biomass was freeze dried and then extracted with ethanol to produce the extract treatment for application to plants. The ethanol extract process comprised, first mixing 600 grams of biomass with 3,000 mL of ethanol and heated at reflux for 2 hours. The reaction mixture was then filtered while hot and the biomass was extracted again with ethanol twice (2 times at 3,000 mL). The combined organic extracts from the process were concentrated to yield the extract treatment.

The salt stressed plantlets were also supplemented with 100 mM of NaCl. Seven days after the plantlets were treated plant dry weight, root length, amount of chlorotic leaves, and the amount of plants with chlorosis were measured. The results are shown in Tables 1-3, which display the results for each tested concentration with respect to the untreated control. For chlorosis metric, the reduction in the effect of chlorosis with respect to the control (i.e., improvement over the control) is represented as a negative (−) value.

TABLE 1

Growth (No Salt Stress)

| Concentration | Dry Weight % Difference vs. Control | Root Length % Difference vs. Control |
|---|---|---|
| 0.01% | −24.2 | −6.6 |
| 0.001% | −12.2 | +9.9 |
| 0.0001% | −20.4 | −5.4 |

TABLE 2

Salt Stress

| Concentration | Dry Weight % Difference vs. Control | Root Length % Difference vs. Control |
|---|---|---|
| 0.01% | −10 | +30 |
| 0.001% | −6.9 | +26.3 |
| 0.0001% | +22.7 | +52.3 |

TABLE 3

Chlorosis

| Concentration | Cholorotic leaves % Difference vs. Control | Plants with Chlorosis % Difference vs. Control |
|---|---|---|
| 0.01% | +11.5 | +4.2 |
| 0.001% | +72.5 | +45.8 |
| 0.0001% | +41.9 | +25.0 |

Example 11

An experiment was performed to determine the effect of treating *Arabidopsis thaliana* with an extract of *Kappaphycus alvarezzi* under normal growth conditions and under temperature stressed conditions. The bioassay was initiated using four day old plantlets grown on half strength Murashige and Skoog (MS) medium, supplemented with 1% (w/v) sucrose and solidified with 0.7% (w/v) agar in square petri plates. Plates were vertically stacked in the growth chamber set at 22° C. with 16-h light/8-h dark cycle, with light intensity of 100 μmol/m$^{-2}$s$^{-1}$. Each plate contained five replicate plantlets. Plantlets were transferred on medium supplemented with concentrations of 0.001% (0.001 mL/L) or 0.0001% (0.0001 mL/L) of an extract of *Kappaphycus alvarezzi* and compared to an untreated control. The treatments were prepared as described in Example 10. After seven days, half of the plates were placed in a growth chamber and subjected to three days of continuous temperature stress (35° C.) while the other half were maintained at about 22° C. Following the temperature stress period, the plantlets were allowed to grow for seven additional days, and plant dry weight was measured at the end. The results are shown in Tables 4-5, which display the results for each tested concentration with respect to the untreated control.

TABLE 4

Growth (No temperature Stress)

| Concentration | Dry Weight % Difference vs. Control |
|---|---|
| 0.001% | −26.5 |
| 0.0001% | −8.7 |

TABLE 5

Temperature Stress

| Concentration | Dry Weight % Difference vs. Control |
|---|---|
| 0.001% | −11.2 |
| 0.0001% | −4.3 |

Example 12

An experiment was performed to determine the effect of treating *Phaseolus aureus* (mung bean) with an extract of *Kappaphycus alvarezzi* under normal growth conditions. The biomass as initiated using cut mung bean seedlings which were grown in vials supplemented with concentrations of 0.01% (0.01 mL/L), 0.001% (0.001 mL/L), or 0.0001% (0.0001 mL/L) of an extract of *Kappaphycus alvarezzi* and compared to an untreated control. The mung bean seedlings were initially grown on vermiculite for two weeks and then cut approximately 3 cm below the cotyledons. Cut seedlings were placed in glass scintillation vials to which 15 mL of water or treatments were added. The treatments were prepared as described in Example 10. Five seedlings were used for each treatment. The root growth parameters of distance of root growth from meristem, number of roots, and root length were measured after 7 days. The results are shown in Table 6, which display the results for each tested concentration with respect to the untreated control.

TABLE 6

| Concentration | Distance of Root Growth from Meristem % Difference vs. Control | Number of Roots % Difference vs. Control | Root Length % Difference vs. Control |
|---|---|---|---|
| 0.01% | −8.5 | +0.47 | +10.91 |
| 0.001% | −20 | +0.43 | +31.03 |
| 0.0001% | −26.1 | −26.8 | +8.31 |

ASPECTS OF THE INVENTION

In one non-limiting embodiment, a method of plant enhancement may comprise administering to a plant, seedling, or seed a composition treatment comprising 0.0001-0.01% by weight of *Kappaphycus* active ingredient composition, such as an active ingredient *Kappaphycus* extract to modify at least one characteristic of plant growth, plant health, or both. In some embodiments, the *Kappaphycus* extract may be applied to a plant in at least one of salt stress and heat stress conditions. Temperature stress conditions are discussed elsewhere herein. In general, salt stress is considered to be present when soil has a salt concentration of greater than 40 mM NaCl. In some aspects, the concentration of salt in the soil is 50 mM or more, 60 mM or more, 75 mM or more, 80 mM or more, or even 100 mM NaCl or more (or equivalent salt concentration).

In another non-limiting embodiment, a composition may comprise an extract of *Kappaphycus*, in a concentration in the range of 0.0001-0.01% by weight, which is active with respect to detectably modulating at least one characteristic of plant growth, plant health, or both.

In another non-limiting embodiment, a method of preparing a composition may comprise subjecting *Kappaphycus* to an extraction process; separating the extracted aqueous and biomass fractions; and diluting the concentration of aqueous extract to a concentration in the range of 0.0001-0.01% by weight.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law), regardless of any separately provided incorporation of particular documents made elsewhere herein.

The use of the terms "a" and "an" and "the" and similar referents in the context of describing the invention are to be construed to cover both the singular and the plural, unless otherwise indicated herein or clearly contradicted by context.

Unless otherwise stated, all exact values provided herein are representative of corresponding approximate values (e.g., all exact exemplary values provided with respect to a particular factor or measurement can be considered to also provide a corresponding approximate measurement, modified by "about," where appropriate). All provided ranges of values are intended to include the end points of the ranges, as well as values between the end points.

The description herein of any aspect or embodiment of the invention using terms such as "comprising", "having," "including," or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

All headings and sub-headings are used herein for convenience only and should not be construed as limiting the invention in any way.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The citation and incorporation of patent documents herein is done for convenience only and does not reflect any view of the validity, patentability, and/or enforceability of such patent documents.

This invention includes all modifications and equivalents of the subject matter recited in the claims and/or aspects appended hereto as permitted by applicable law.

What is claimed is:

1. A method of enhancing a plant comprising administering to the plant in a condition of salt stress a composition comprising *Kappaphycus alvarezzi* in an amount of 0.0001-1% by weight to enhance the plant with resistance to salt stress.

2. The method of claim 1, wherein the composition comprises an extract from *Kappaphycus alvarezzi* biomass.

3. The method of claim 1, wherein the composition is administered directly to the plant.

4. The method of claim 1, wherein the method comprises indirectly administering the composition to the plant.

5. The method of claim 3, wherein the plant is a seed or a seedling when the composition is administered or first administered.

6. The method of claim 2, wherein the composition is administered at a rate of about 1-125 gallons/acre for soil applications.

7. The method of claim 1, wherein the method comprises repeated administration of the composition.

8. The method of claim 1, wherein salt stress comprises a high salt condition of at least about 100 mM NaCl.

9. The method of claim 1, wherein the enhanced resistance to salt stress produces increased root growth comprising an increased distance of root length from the plant meristem by at least 10%, increased total root length by at least 10%, or both, over an untreated control.

10. The method of claim 1, wherein the enhanced resistance to salt stress produces increased plant growth comprising an increased plant dry weight by at least 10% over an untreated control.

11. The method of claim 1, wherein the plant is a legume.

12. The method of claim 11, wherein the legume is a bean.

13. The method of claim 1, wherein the composition is applied at a rate of about 10-50 gallons/acre for foliar applications.

14. The method of claim 1, wherein the method comprises administering the composition in combination with a microalgae composition that independently enhances at least one characteristic of the plant.

15. The method of claim 14, wherein the microalgae composition comprises microalgae cells or microalgae derivatives obtained from microalgae cells, wherein the microalgae cells are selected from *Chlorella* cells, *Aurantiochytrium* cells, or a combination thereof.

* * * * *